US012785976B2

(12) United States Patent
Li et al.

(10) Patent No.: US 12,785,976 B2
(45) Date of Patent: Nov. 3, 2026

(54) VERIFICATION METHODS AND APPARATUSES FOR ELECTRONIC DEVICE INSURING

(71) Applicant: ALIPAY (HANGZHOU) INFORMATION TECHNOLOGY CO., LTD., Hangzhou (CN)

(72) Inventors: Xiaorui Li, Hangzhou (CN); Jianchi Wu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 333 days.

(21) Appl. No.: 18/151,392

(22) Filed: Jan. 6, 2023

(65) Prior Publication Data

US 2023/0163972 A1 May 25, 2023

Related U.S. Application Data

(63) Continuation of application No. PCT/CN2021/104243, filed on Jul. 2, 2021.

(30) Foreign Application Priority Data

Jul. 3, 2020 (CN) ......................... 202010630297.5

(51) Int. Cl.

*G06F 21/44* (2013.01)
*G06Q 40/08* (2012.01)
*H04L 9/32* (2006.01)

(52) U.S. Cl.

CPC ............ *H04L 9/3234* (2013.01); *G06F 21/44* (2013.01); *G06Q 40/08* (2013.01)

(58) Field of Classification Search

CPC ... H04L 9/3234; H04L 9/0643; H04L 9/3213; G06F 21/44; G06Q 40/08
See application file for complete search history.

(56) References Cited

U.S. PATENT DOCUMENTS 9,818,157 B2 * 11/2017 McCall .............. G06Q 20/3276
10,650,464 B1 * 5/2020 McCall .............. G06Q 30/0207

(Continued)

FOREIGN PATENT DOCUMENTS

CN 1694555 11/2005
CN 103491090 1/2014

(Continued)

OTHER PUBLICATIONS

Fang, Yuan-Jin-Electronic Device Screen Checking Method and System (Year: 2016).*

(Continued)

*Primary Examiner* — Farid Homayounmehr
*Assistant Examiner* — Mudasiru K Olaegbe
(74) *Attorney, Agent, or Firm* — Fish & Richardson P.C.

(57) ABSTRACT

The present specification discloses verification methods and apparatuses for electronic device insuring. In a computer-implemented method performed by an auxiliary device, an image of an insurance application verifying page of an object device is collected, where a graph verification code is displayed on the insurance application verifying page. A camera of the auxiliary device is invoked based on the graph verification code to collect a device image of the object device. A verification token displayed by the object device is identified. Validity detection is performed based on the verification token. The device image is determined as insurance application verification data of the object device.

20 Claims, 20 Drawing Sheets

(56) References Cited

U.S. PATENT DOCUMENTS

| | | | | |
|---|---|---|---|---|
| 2002/0126780 | A1* | 9/2002 | Oshima | H04H 60/91 705/56 |
| 2009/0234678 | A1* | 9/2009 | Arenas | G06Q 10/10 705/4 |
| 2010/0088123 | A1* | 4/2010 | McCall | G06Q 40/08 707/E17.001 |
| 2016/0358174 | A1* | 12/2016 | Kassemi | G06Q 20/12 |
| 2018/0077150 | A1* | 3/2018 | Narayan | H04W 12/50 |
| 2021/0264445 | A1* | 8/2021 | Axelrod | B64F 1/366 |
| 2023/0394505 | A1* | 12/2023 | McLaney | G06Q 20/3276 |

FOREIGN PATENT DOCUMENTS

| | | | |
|---|---|---|---|
| CN | 105162993 | | 12/2015 |
| CN | 105976252 | A | 9/2016 |
| CN | 109285079 | | 1/2019 |
| CN | 110440421 | | 11/2019 |
| CN | 110929816 | A | 3/2020 |
| CN | 111523109 | | 8/2020 |
| EP | 2602735 | A1 | 6/2013 |
| KR | 20180120536 | A | 11/2018 |
| KR | 2019-0051321 | | 5/2019 |
| TW | 201917669 | | 5/2019 |
| WO | WO 2020139194 | | 7/2020 |

OTHER PUBLICATIONS

Crosby et al., "BlockChain Technology: Beyond Bitcoin," Sutardja Center for Entrepreneurship & Technology Technical Report, Oct. 16, 2015, 35 pages.
International Preliminary Report on Patentability in International Appln. No. PCT/US2021/104243, mailed on Jan. 12, 2023, 6 pages (with English translation).
International Search Report and Written Opinion in International Appln. No. PCT/US2021/104243, mailed on Oct. 11, 2021, 7 pages.
Nakamoto, "Bitcoin: A Peer-to-Peer Electronic Cash System," www.bitcoin.org, 2008, 9 pages.

* cited by examiner

FIG. 11
10:45
Mobile phone verification
Use another mobile phone to scan the
two-dimensional code to start photographing
964572

VERIFICATION METHODS AND APPARATUSES FOR ELECTRONIC DEVICE INSURING

CROSS-REFERENCE TO RELATED APPLICATIONS

This application is a continuation of PCT Application No. PCT/CN2021/104243 filed on Jul. 2, 2021, which claims priority to Chinese Patent Application No. 202010630297.5, filed on Jul. 3, 2020, and each application is hereby incorporated by reference in its entirety.

TECHNICAL FIELD

This specification relates to the field of Internet technologies, and in particular, to verification methods and apparatuses for electronic device insuring.

BACKGROUND

With rapid development of Internet technologies, more and more insurance services can be implemented via the Internet, for example, online insurance application, online insurance verification and underwriting, and online claim settlement. How to improve processing efficiency and processing accuracy of online insurance services has become an urgent problem to be solved.

SUMMARY

In view of the previously described content, this specification provides verification methods and apparatuses for electronic device insuring.

Specifically, this specification is implemented by using the following technical solutions: a verification method for electronic device insuring, applied to an auxiliary device and including the following: an image of an insurance application verifying page of an object device is collected, where a graph verification code is displayed on the insurance application verifying page; a camera of an auxiliary device is invoked based on the graph verification code to collect a device image of the object device; a verification token displayed by the object device is identified, and validity detection is performed based on the verification token; and after the validity detection is passed, the device image is determined as insurance application verification data of the object device.

A verification method for electronic device insuring, applied to an object device and including the following: a verification token and a graph verification code are generated when auxiliary verification for electronic device insuring is triggered; and the verification token and the graph verification code are displayed, so an auxiliary device invokes, based on the graph verification code, a camera of the auxiliary device to collect a device image of the local device, performs validity detection based on the verification token, and after the validity detection is passed, determines the device image as insurance application verification data of the local device.

A verification apparatus for electronic device insuring, applied to an auxiliary device and including: a first collection unit, configured to collect an image of an insurance application verifying page of an object device, where a graph verification code is displayed on the insurance application verifying page; a second collection unit, configured to invoke a camera of the auxiliary device based on the graph verification code to collect a device image of the object device; a validity detection unit, configured to: identify a verification token displayed by the object device, and perform validity detection based on the verification token; and a data determining unit, configured to: after the validity detection is passed, determine the device image as insurance application verification data of the object device.

A verification apparatus for electronic device insuring, applied to an object device and including: a generation unit, configured to generate a verification token and a graph verification code when auxiliary verification for electronic device insuring is triggered; and a display unit, configured to display the verification token and the graph verification code, so an auxiliary device invokes, based on the graph verification code, a camera of the auxiliary device to collect a device image of the local device, performs validity detection based on the verification token, and after the validity detection is passed, determines the device image as insurance application verification data of the local device.

A verification apparatus for electronic device insuring, including: a processor; and a memory, configured to store machine executable instructions; where by reading and executing the machine executable instructions that are stored in the memory and that are corresponding to a verification logic of electronic device insuring, the processor is enabled to: collect an image of an insurance application verifying page of an object device, where a graph verification code is displayed on the insurance application verifying page; invoke a camera of the auxiliary device based on the graph verification code to collect a device image of the object device; identify a verification token displayed by the object device, and perform validity detection based on the verification token; and after the validity detection is passed, determine the device image as insurance application verification data of the object device.

A verification apparatus for electronic device insuring, including: a processor; and a memory, configured to store machine executable instructions; where by reading and executing the machine executable instructions that are stored in the memory and that are corresponding to a verification logic of electronic device insuring, the processor is enabled to: generate a verification token and a graph verification code when auxiliary verification for electronic device insuring is triggered; and display the verification token and the graph verification code, so an auxiliary device invokes, based on the graph verification code, a camera of the auxiliary device to collect a device image of the local device, performs validity detection based on the verification token, and after the validity detection is passed, determines the device image as insurance application verification data of the local device.

According to an embodiment of this specification, a verification token is used to perform validity detection in a process of collecting insurance application verification data, so cheating operations such as re-photographing and screen snipping can be effectively identified, forged insurance application verification data can be identified, and an electronic device is prevented from "performing insurance application with illness undisclosed". Therefore, the risk of financial loss of insurance companies is effectively reduced, facilitating the promotion of online insurance services.

DESCRIPTION OF EMBODIMENTS

Figure 1:
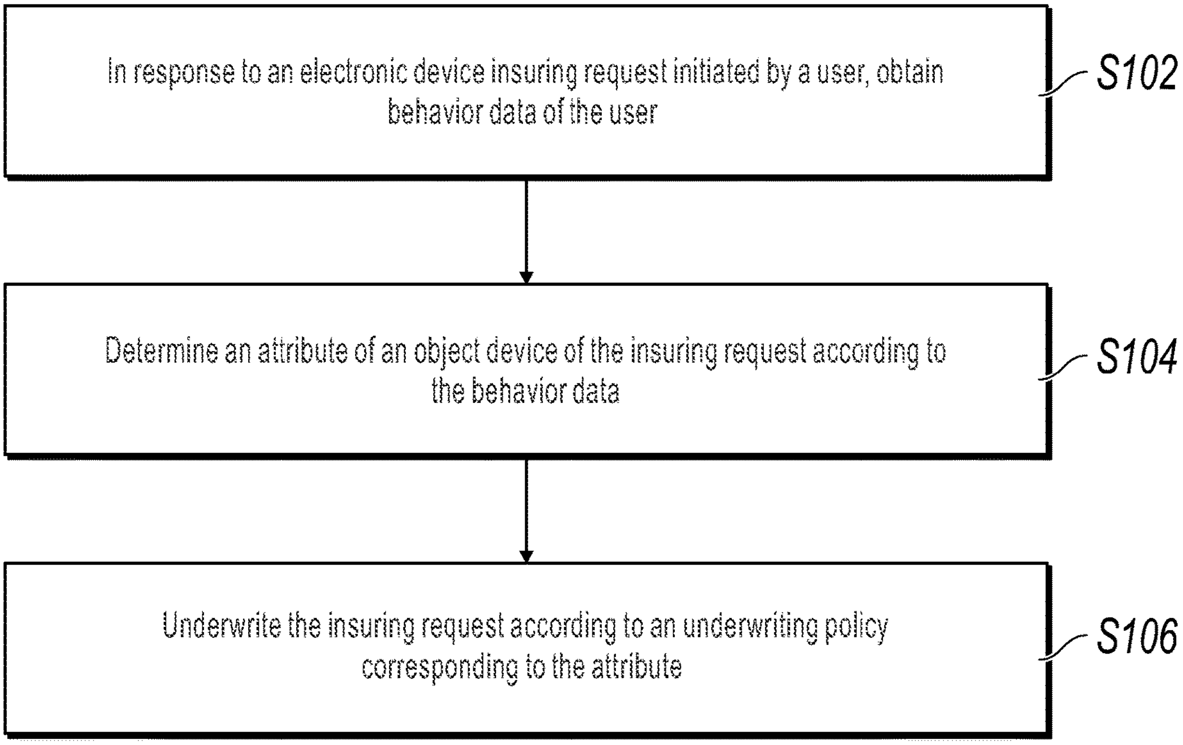
FIG. 1 is a schematic flowchart illustrating an insurance implementation method of an electronic device, according to an example embodiment of this specification.

Example embodiments are described in following details, and examples of the example embodiments are presented in the accompanying drawings. When the following description relates to the accompanying drawings, unless specified otherwise, same numbers in different accompanying drawings represent same or similar elements. Embodiments described in the following example embodiments do not represent all embodiments consistent with this specification. On the contrary, the embodiments are merely examples of apparatuses and methods that are described in the appended claims in details and consistent with some aspects of this specification.

The terms used in this specification are merely for illustrating specific embodiments, and are not intended to limit this specification. The terms "a" and "the" of singular forms used in this specification and the appended claims are also intended to include plural forms, unless otherwise specified in the context clearly. It should be further understood that the term "and/or" used in this specification indicates and includes any or all possible combinations of one or more associated listed items.

It should be understood that although terms "first", "second", "third", etc. can be used in this specification to describe various types of information, the information is not limited to the terms. These terms are merely used to differentiate between information of the same type. For example, without departing from the scope of this specification, first information can also be referred to as second information, and similarly, the second information can be referred to as the first information. Depending on the context, for example, the word "if" used here can be explained as "while", "when", or "in response to determining".

This specification provides a verification implementation solution for electronic device insuring.

Insurance for the previous electronic device insuring can be screen insurance of the electronic device, or can be a type of insurance that can be applied for the electronic device such as comprehensive guarantee insurance of the electronic device.

The electronic device can be a terminal device such as a mobile phone, a tablet computer, or a personal digital assistant (PDA). The electronic device can also be a multimedia device such as a camera or an intelligent television. This is not specifically limited in this specification.

The insurance implementation solution of the electronic device can be implemented in cooperation with the electronic device and a server. The server can be deployed by a service provider providing an insurance service, such as an insurance company or a third-party insurance sales platform.

In a process of implementing an insurance service, the electronic device and the server can interact with each other in a transmission method such as wired or wireless. Interaction between the electronic device and the server generally refers to interaction between client software loaded in the electronic device and the server. For example, a user interacts with the server after logging in to the client using a registered user account, and this can also be referred to as interaction between the user and the server.

The following separately describes a specific implementation process of this specification by using the following four aspects: insuring, underwriting, claim settlement, and insurance parameter determining of the electronic device. I. Insuring for the electronic device FIG. 1 is a schematic flowchart illustrating an insurance implementation method of an electronic device, according to an example embodiment of this specification.

Referring to FIG. 1, the insurance implementation method of the electronic device can be applied to a server and includes the following steps: Step 102: In response to an electronic device insuring request initiated by a user, obtain behavior data of the user.

In this embodiment, the user can initiate the electronic device insuring request by using a selling entry of electronic device insurance. For example, a client can send the electronic device insuring request after the user triggers a specified entry of a payment result page, and the electronic device insuring request carries a user account.

After receiving the electronic device insuring request, a server obtains the behavior data of the corresponding user according to the user account.

The behavior data can include historical transaction data of the user, historical login data of the user, current login data of the user, etc.

In another example, after receiving the electronic device insuring request, the server can first determine whether the user is included in a blacklist, and if the user is not included, can perform the step of obtaining the behavior data of the user.

The blacklist can be predetermined.

For example, a historically identified fraud user can be added to the blacklist.

For another example, an employee in the electronic device maintenance industry can also be added to the blacklist.

For another example, an employee in the 3C industry can also be added to the blacklist.

Filtering with the blacklist can effectively filter out high-risk people, improve security of online insurance application, and reduce the risk of financial loss of an insurer.

Step 104: Determine an attribute of an object device of the insuring request according to the behavior data.

Based on step 102, after obtaining the behavior data of the user, the server can determine, according to the behavior data, an attribute of an object electronic device (subsequently referred to as an object device) currently insured by the user. For example, the attribute of the object device can be determined in different methods for different behavior data.

The attribute of the object device can include a new device and an old device.

Step 106: Underwrite the insuring request according to an underwriting policy corresponding to the attribute.

In this embodiment, a mapping relationship between attributes of different object devices and corresponding insuring policies can be preconfigured and stored. After the attribute of the object device is determined in step 104, a corresponding underwriting policy can be searched for in the mapping relationship, and then the corresponding underwriting policy is used to underwrite the electronic device insuring request.

If the attribute of the object device is a new device, a device verifying process can be avoided, and it is directly determined that underwriting is passed, thereby improving underwriting efficiency and improving insuring experience of the user.

If the attribute of the object device is an old device, the user can be prompted to upload verification data of the object device, and the server can further perform device verification and underwriting according to the verification data.

It can be learned from the previous description that in this embodiment, after receiving the electronic device insuring request, the server can obtain the behavior data of the user, determine the attribute of the electronic device according to the behavior data, and underwrite the insuring request according to the underwriting policy corresponding to the attribute. Underwriting using a differentiated underwriting policy can ensure underwriting accuracy while improving underwriting efficiency, thereby improving insuring experience of the user.

The following describes in detail a method of determining an attribute of an object device by using several embodiments.

Figure 2:
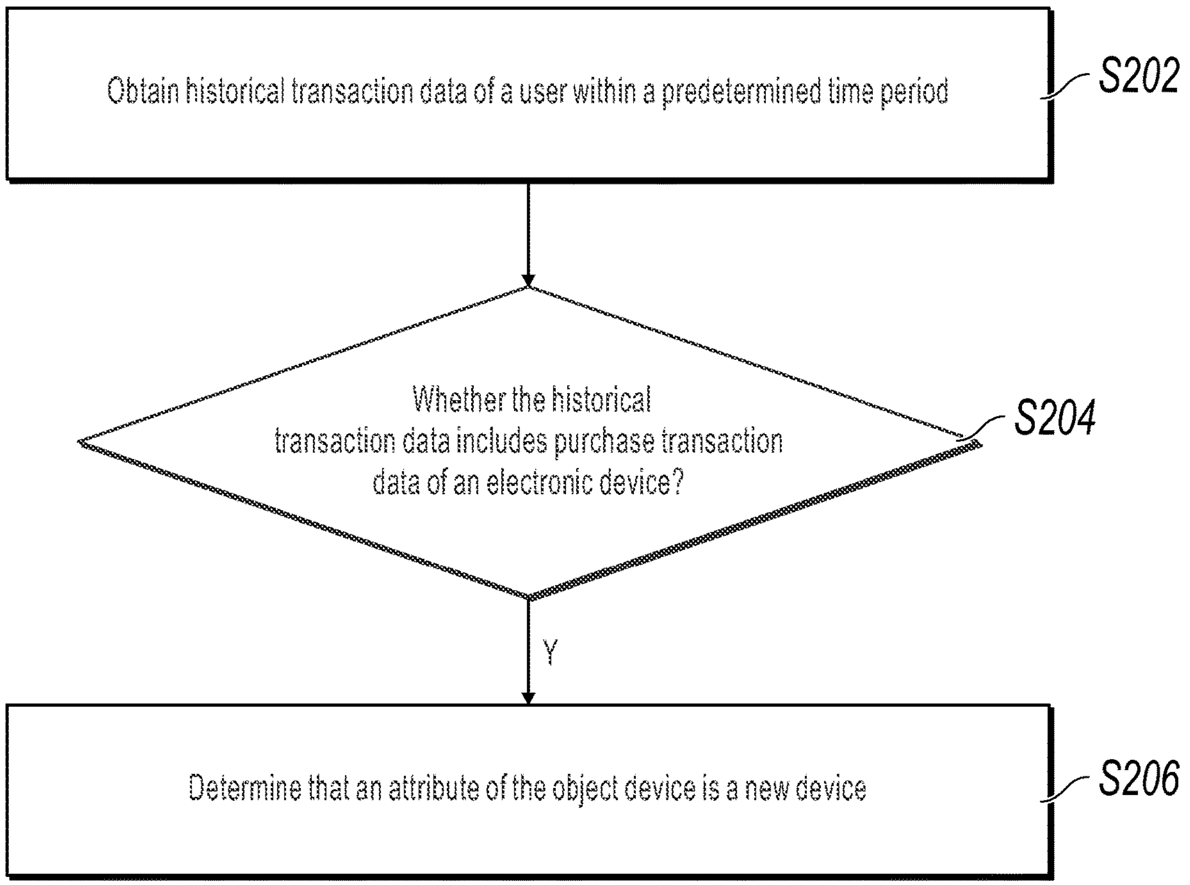
FIG. 2 is a schematic flowchart illustrating a method for determining an attribute of an object device, according to an example embodiment of this specification.

FIG. 2 is a schematic flowchart illustrating a method for determining an attribute of an object device, according to an example embodiment of this specification.

Referring to FIG. 2, the method for determining an attribute of an object device can include the following steps:

Step 202: Obtain historical transaction data of a user within a predetermined time period.

In this embodiment, after receiving an electronic device insuring request sent by the user, a server can obtain a user account of the initiating user, and then obtain the historical transaction data of the corresponding user within the predetermined time period from several e-commerce platforms based on the user account.

For example, the server can determine identity information of the user based on the user account, and then obtain the historical transaction data based on the identity information.

In this embodiment, each piece of historical transaction data can include information such as an order number, an order time, an identifier of a purchased item, an item type, and a merchant identifier. The predetermined time period can be predetermined by a developer, for example, within 10 days or within 15 days.

Step 204: Determine whether the historical transaction data includes purchase transaction data of an electronic device.

Step 206: If yes, determine that an attribute of the object device is a new device.

Based on step 202, after obtaining the historical transaction data of the user within the predetermined time period, the server can determine, according to the historical transaction data, whether the user has purchased, within the predetermined time period, an electronic device that can be insured.

If yes, it can be presumed that the user wants to insure the newly purchased electronic device, and further, the attribute of the object device can be determined as a new device.

For example, Xiao Bai logs in to an account of Xiao Bai in a client loaded in a mobile phone of Xiao Bai, and then sends an insuring request for a mobile phone screen insurance to the server. After receiving the insuring request, the server can determine identity information of Xiao Bai such as a unique identity according to the account of Xiao Bai. Then, transaction data of Xiao Bai within the last 15 days is obtained from the e-commerce platform according to the identity information of Xiao Bai, and it is determined, based on the transaction data within the 15 days, whether Xiao Bai has purchased the mobile phone. If yes, it can be presumed that Xiao Bai wants to insure the newly purchased mobile phone, and further, the attribute of the object device of the insuring request can be determined as a new device.

In another example, if the historical transaction data includes purchase transaction data of a plurality of electronic devices, the server can send a corresponding electronic device list to the user, so the user selects an object device to be insured. After receiving a selection instruction sent by the user based on the electronic device list, the server can determine an electronic device selected by the user as the object device insured this time.

Xiao Bai is still used as an example. Assume that the transaction data of Xiao Bai within the last 15 days includes purchase records of two mobile phones, a list including the two mobile phones can be sent to Xiao Bai. The list can include data such as a mobile phone model, a purchase date, a purchase price, and merchant information. Xiao Bai can select a mobile phone to be insured from the list. After receiving the selection instruction of Xiao Bai, the server can determine the mobile phone selected by Xiao Bai as the object device of the current insuring request.

It is worthwhile to note that if it is determined, according to the historical transaction data of the user, that a plurality of electronic devices purchased by the user are the same model, the electronic device list may not be sent to the user. For example, if Xiao Bai buys two same mobile phones, the list may not be sent to Xiao Bai. The server can confirm that Xiao Bai wants to insure the new devices of this model.

In this embodiment, in addition to the e-commerce platform, the server can also obtain the historical transaction data of the user in another method, for example, can obtain local transaction data of the user in an entity shopping mall from a server of the entity shopping mall. This is not specifically limited in this specification.

In this embodiment, the server can determine, by using the historical transaction data of the user, whether the attribute of the object device to be insured is a new device. On one hand, the user does not need to upload a purchase certificate, which can greatly simplify an insuring operation of the user, thereby improving insuring efficiency. On the other hand, a limitation that a new device can only be insured at the time of purchase is removed, which greatly improves insuring experience of the user.

Figure 3:
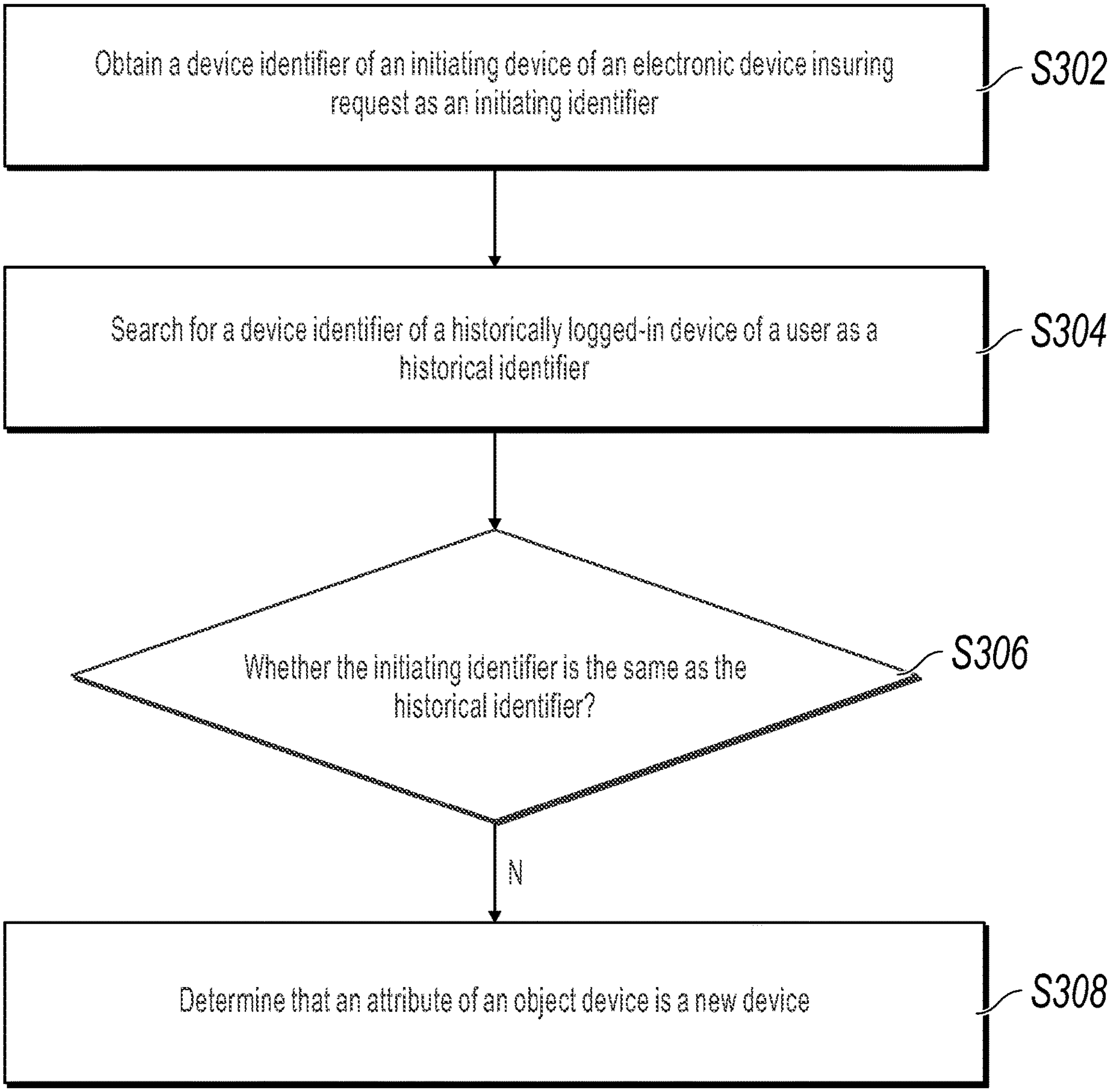
FIG. 3 is a schematic flowchart illustrating another method for determining an attribute of an object device, according to an example embodiment of this specification.

FIG. 3 is a schematic flowchart illustrating another method for determining an attribute of an object device, according to an example embodiment of this specification.

Referring to FIG. 3, the method for determining an attribute of an object device can include the following steps: Step 302: Obtain a device identifier of an initiating device of an electronic device insuring request as an initiating identifier.

In this embodiment, after a user logs in to a server based on a user account in a client, the client can obtain a device identifier of an electronic device used by the user, and report the device identifier to the server. The device identifier can be separately reported by the client, or the device identifier can be added by the client to a service request and reported to the server. For example, the client can add the device identifier to the electronic device insuring request sent by the user and send the device identifier to the server. This is not specifically limited in this specification.

The device identifier can include: Android ID, identifier for vendor (IDFV), international mobile equipment identity (IMEI), etc.

In this embodiment, after receiving the electronic device insuring request, the server can obtain, by using the client, the device identifier of the initiating device that initiates the electronic device insuring request, and can use the device identifier as the initiating identifier.

Step 304: Search for a device identifier of a historically logged-in device of a user as a historical identifier.

In this embodiment, the server can further query a database based on the user account to obtain the device identifier of the historically logged-in device of the corresponding user. The database stores a device identifier of each electronic device used when the user historically logs in to the server.

In an example, the server can obtain, from the database, device identifiers of electronic devices used when the user logs in to the server for the most recent several times, as historical identifiers. There are a plurality of historical identifiers.

In another example, considering that the user generally does not replace the electronic device frequently for no reason, the server can also obtain, from the database, a device identifier of an electronic device used when the user logs in to the server the latest time, as the historical identifier.

Step 306: Determine whether the initiating identifier is the same as the historical identifier.

Step 308: If different, determine that an attribute of an object device is a new device.

Based on steps 302 and 304, the server can determine whether the initiating identifier is the same as the historical identifier.

When the server obtains the device identifier of the electronic device used when the user logs in to the server the latest time as the historical identifier, if the initiating identifier and the historical identifier are different, it can indicate that the user has replaced the electronic device, and it can be presumed that the user insures the newly replaced electronic device, and further, the attribute of the object device can be determined as a new device.

If the server obtains a plurality of historical identifiers, it can be separately determined whether the initiating identifier is the same as each historical identifier. If the initiating identifier is the same as none of the historical identifiers, it can indicate that the user has replaced the electronic device, and it can be presumed that the user insures the newly replaced electronic device, and further, the attribute of the object device can be determined as a new device.

In another example, when the device attribute of the object device is determined by using the device identifier, it can be further determined whether the user is a trusted user. If the user is not a trusted user, the attribute of the object device is not determined as a new device even if the initiating identifier and the historical identifier are different, but the attribute of the object device is determined as an old device, thereby improving accuracy of a subsequent underwriting result, and reducing a risk of insurance fraud due to underwriting pass by directly skipping mobile phone verification.

If the user is a trusted user, when the initiating identifier and the history identifier are different, the attribute of the object device can be determined as a new device.

In this embodiment, whether the user is a trusted user can be determined according to registration duration, login frequency, etc. of the user.

In an example, it can be determined whether the registration duration of the user is less than a duration threshold. If the registration duration is less than the duration threshold, it can be determined that the user is not a trusted user.

The duration threshold can be predetermined, for example, one month or three months.

In another example, it can be determined whether the user has recently logged in to the user account. If the user has not logged in to the user account, it can be determined that the user is not a trusted user.

For example, it can be determined whether the user logged in to the user account in the last one month/three months.

In contrast, if the registration duration of the user is greater than or equal to the duration threshold, and the user account is recently logged in, it can be determined that the user is a trusted user.

In this embodiment, the server can determine, according to the device identifier of the user-logged device, whether the device insured by the user is a new device, so as to alleviate a problem of inaccurate identification of a new object device caused by incomplete acquisition of historical transaction data. In addition, the user does not need to upload a purchase certificate, so the insuring operation of the user can be greatly simplified, and insuring efficiency can be improved.

It is worthwhile to note that an execution sequence of the methods for determining an attribute of an object device in the embodiments shown in FIG. 2 and FIG. 3 is not limited in this specification. In addition, in the implementation solution for determining an attribute of an object device, if the attribute of the object device cannot be determined as a new device by using the historical transaction data and the device identifier, the attribute of the object device can be determined as an old device, and subsequently verification data uploaded by the user is used for underwriting, thereby ensuring underwriting accuracy.

In addition, after determining the attribute of the object device, the server can further send the attribute of the object device to the client for confirmation by the user, and the user can adjust the attribute according to an actual situation.

It is still assumed that Xiao Bai has purchased a new device within the last 15 days, and the server determines that the attribute of the object device is "a new device", so "a new device" can be returned to the client as a default attribute. If Xiao Bai does not want to insure the new device, Xiao Bai can select another attribute.

Figure 4:
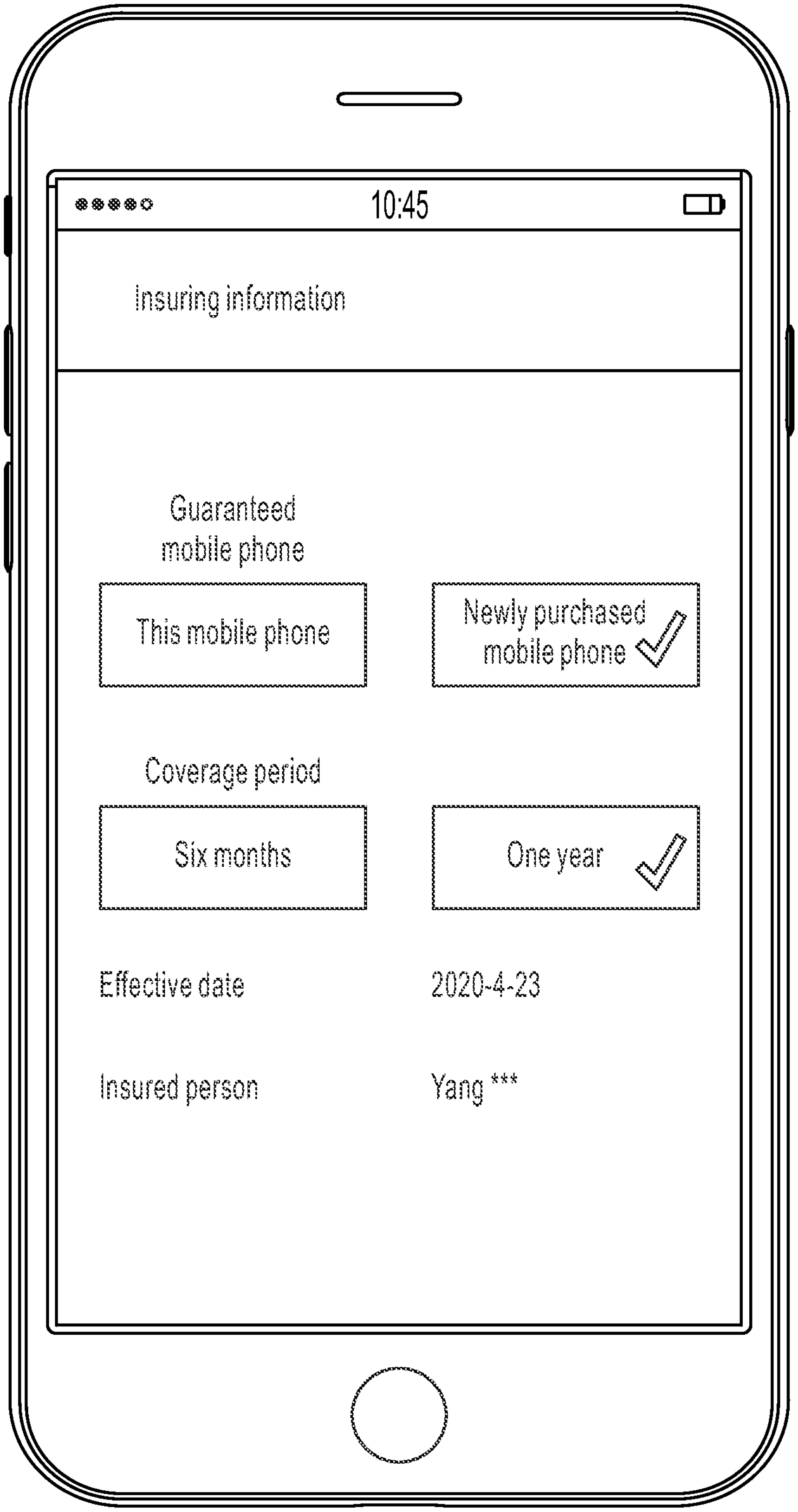
FIG. 4 is a schematic diagram illustrating an insurance application page, according to an example embodiment of this specification.

In actual implementation, for ease of understanding by the user, mobile phone screen insurance is used as an example, and the client can display an insuring page shown in FIG. 4, where "newly purchased mobile phone" and "this mobile phone" in a guaranteed mobile phone item refer to whether the mobile phone that the user wants to insure is this mobile phone.

If the user selects "newly purchased mobile phone", the server can obtain the historical transaction data of the user, and further determines, according to the historical transaction data, whether the user has purchased a new device recently. If yes, it can be determined that the attribute of the object device is a new device, and further, it can be directly determined that underwriting is passed.

If the user selects "this mobile phone", it indicates that the user wants to insure the mobile phone currently in use. The mobile phone currently used by the user can be a new device purchased by the user, that is, the attribute of the object device is a new device. The mobile phone currently used by the user can also be an old device of the user, that is, the attribute of the object device is "an old device". In this case, the server can obtain the history identifier and the initiating identifier, so as to confirm the attribute of the object device, and can perform underwriting by using an underwriting policy corresponding to the determined attribute.

Certainly, in another example, if the electronic device insured by the user is a multimedia device such as a camera or an intelligent television, the user can still use a mobile phone for insuring. However, the "guaranteed device" cannot be the mobile phone, and the developer can develop another user interface. This specification sets no specific limitation thereto.

II. Underwriting

When it is determined that the attribute of the object device is an old device, the server sends the user prompt information for uploading insurance application verification data. The insurance application verification data can be image data such as a photo or a video of the object device. After receiving the verification data, the server can perform device verification by using the verification data to determine whether the object device is intact, so as to determine an underwriting result.

This specification provides a plurality of ways to upload the verification data, which can be selected according to an actual situation.

Figure 5:
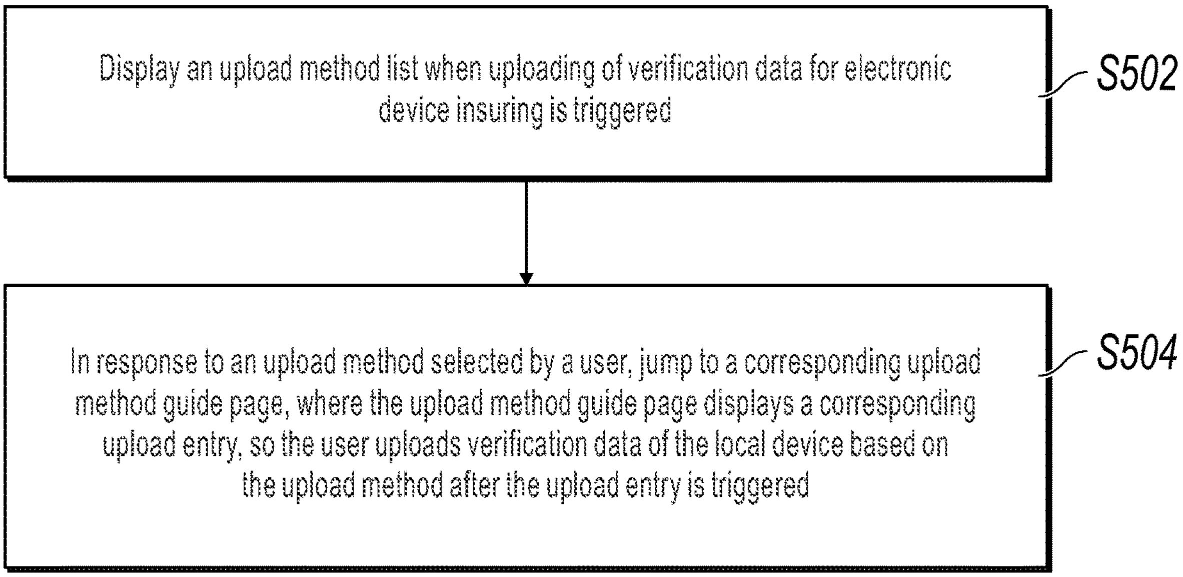
FIG. 5 is a schematic flowchart illustrating a method for uploading verification data, according to an example embodiment of this specification.

FIG. 5 is a schematic flowchart illustrating a method for uploading verification data, according to an example embodiment of this specification.

Referring to FIG. 5, the method for uploading verification data can be applied to an electronic device and include the following steps: Step 502: Display an upload method list when uploading of verification data for electronic device insuring is triggered.

In this embodiment, after receiving prompt information for uploading the verification data, a user can upload the verification data when convenient.

When the user triggers uploading of the verification data, a client of the electronic device can display an upload method list, where the upload method list can display an auxiliary device required for a corresponding upload method, and the user can select an upload method according to an actual situation.

Figure 6:
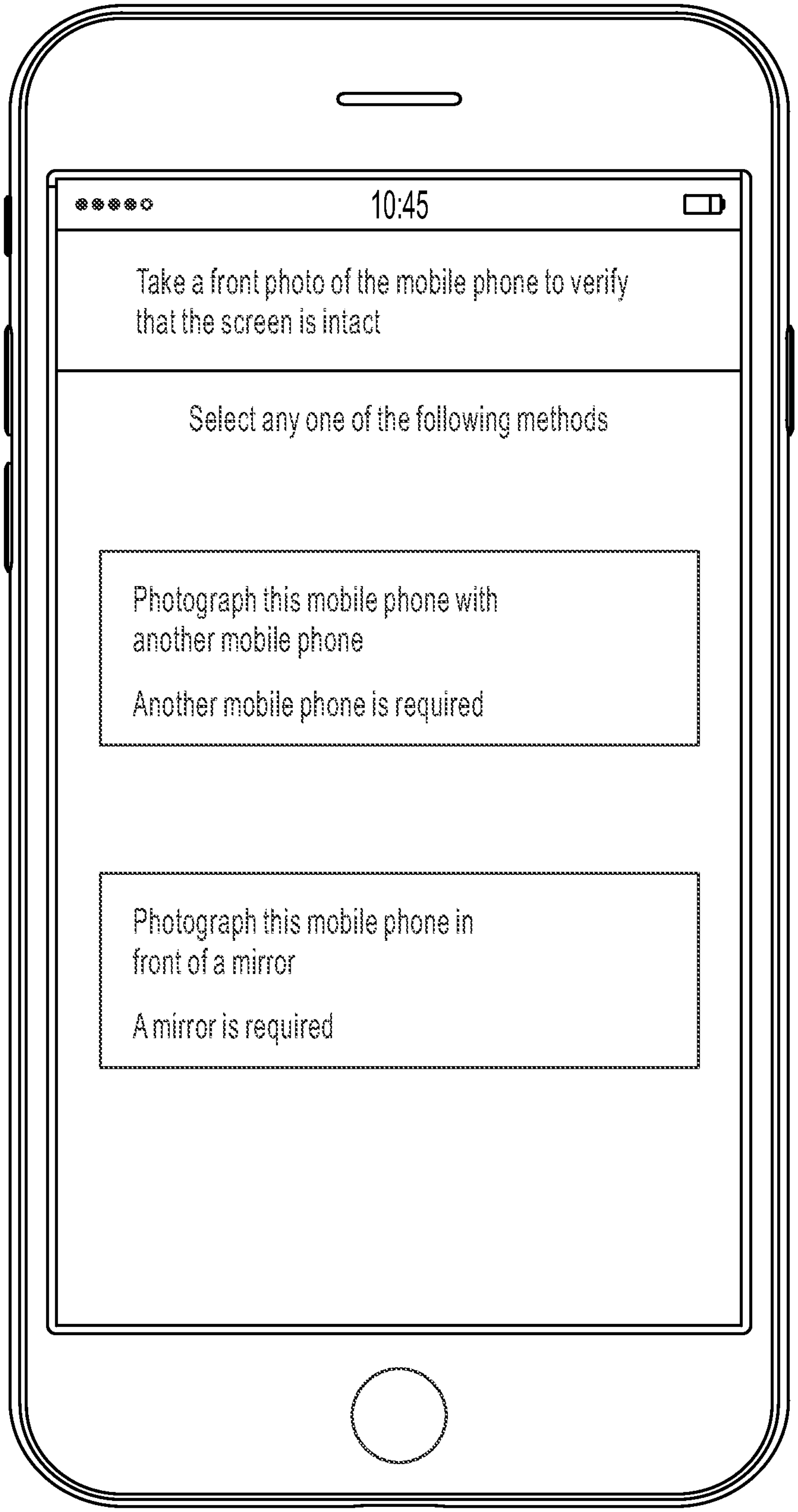
FIG. 6 is a schematic diagram illustrating a page of an insurance application method list, according to an example embodiment of this specification.

Using mobile phone screen insurance as an example, the verification data is a photo or a video of the mobile phone screen. FIG. 6 is a schematic diagram illustrating a page of an insurance application method list. FIG. 6 provides two photographing methods of the mobile phone screen. One is auxiliary photographing by another person, and another mobile phone is required. If the user cannot find another mobile phone, another photographing method can also be selected, that is, the user performs self-photographing in front of a mirror.

An auxiliary device required by auxiliary photographing by another person is another mobile phone. An auxiliary device required by self-photographing is a mirror.

Step 504: In response to an upload method selected by a user, jump to a corresponding upload method guide page, where the upload method guide page displays a corresponding upload entry, so the user uploads insurance application verification data of the local device based on the upload method after the upload entry is triggered.

Based on the upload method list displayed in step 502, the user can select a proper upload method, and the client can further jump to a guide page corresponding to the upload method. The guide page displays details of the corresponding upload method, and displays the upload entry. The user can trigger the upload entry to collect the insurance application verification data.

It can be understood from the previous description that this embodiment provides a plurality of upload methods of the verification data in an electronic device insuring process, and the user can select a proper method to upload the verification data according to an actual situation, so as to implement online uploading of the verification data, which is convenient and fast and greatly improves insuring experience of the user.

The following separately describes in detail the two upload methods.

1. Photographing in Front of a Mirror

Figure 7:
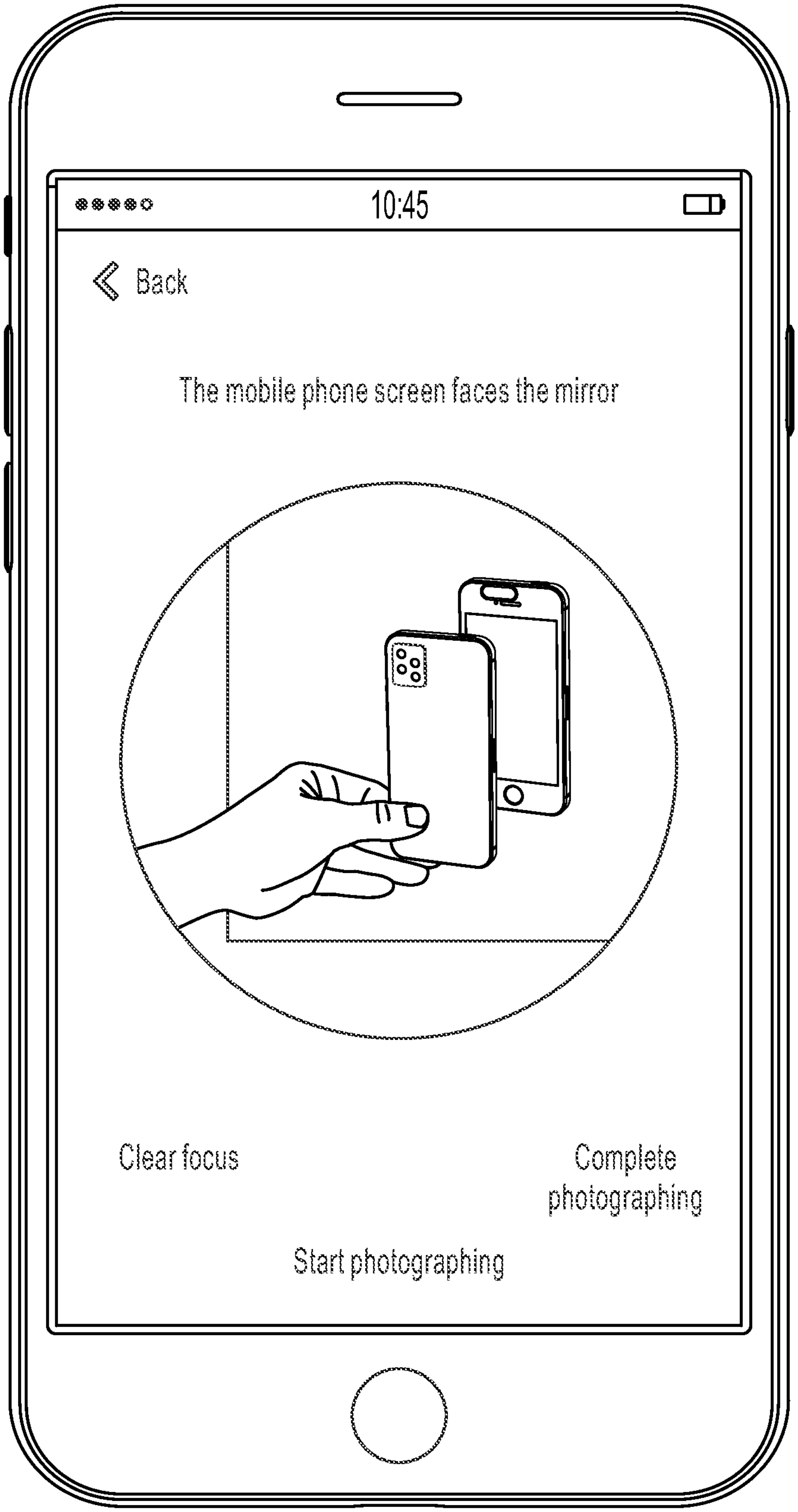
FIG. 7 is a schematic diagram illustrating an upload method guide page, according to an example embodiment of this specification.

Still using the mobile phone screen insurance as an example, if the user triggers, on the page shown in FIG. 6, the upload method of "photographing this mobile phone in front of a mirror", the client can jump to the upload method guide page shown in FIG. 7, where the upload method guide page displays an upload entry “start photographing”, and further displays an example image of the upload method and a photographing requirement.

After triggering the upload entry, the user can invoke a front camera of the electronic device to collect an image such as a photo or a video by using the front camera, and can upload the image to the server as the insurance application verification data after the image is collected.

In another example, after the user triggers the upload entry, a rear camera can be invoked by default, and the user manually switches to the front camera for image collection, which is not specifically limited in this specification.

Figure 8:
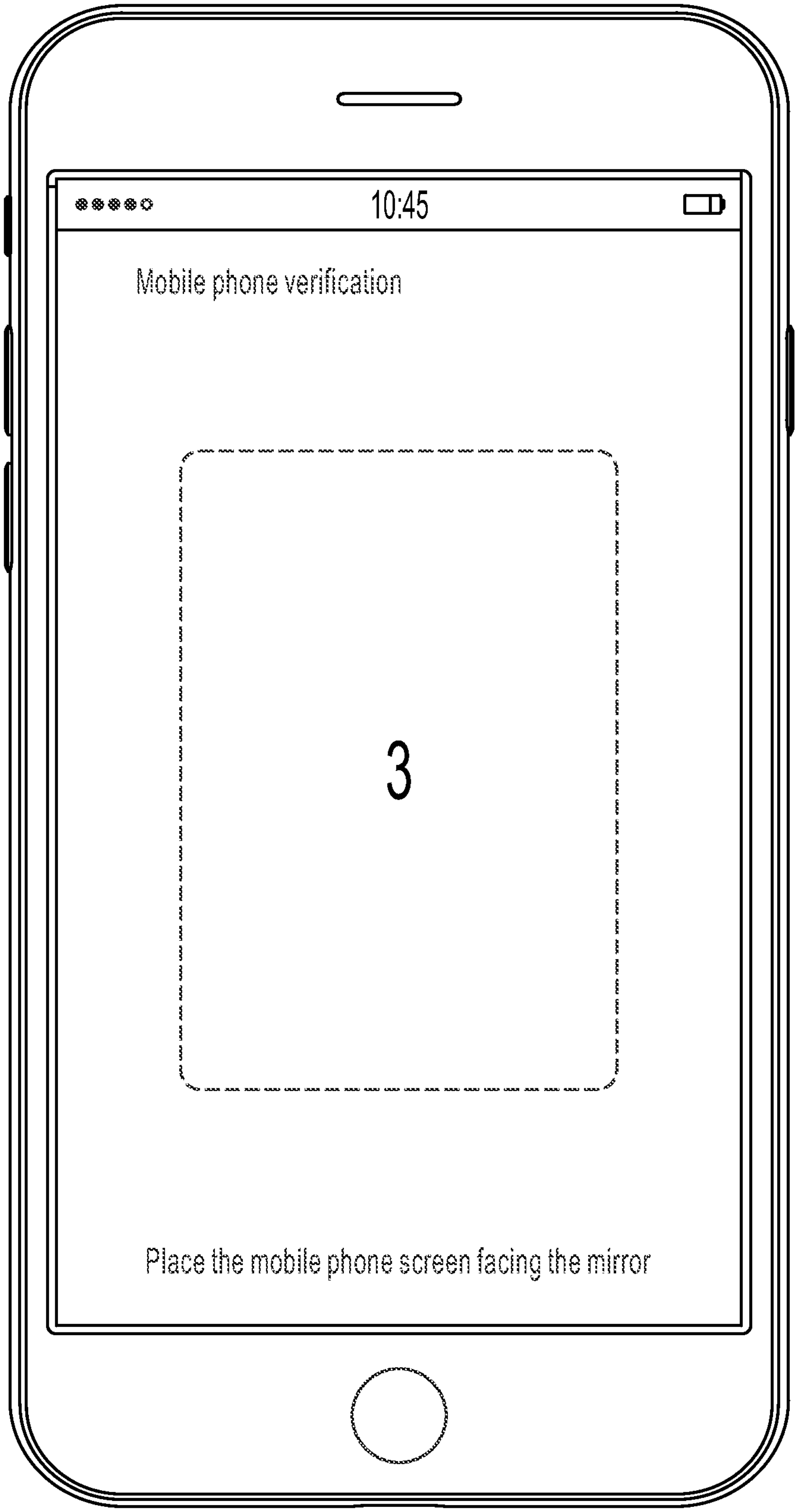
FIG. 8 is a schematic diagram illustrating a photographing countdown page, according to an example embodiment of this specification.

In another example, referring to FIG. 8, because the user needs to flip the mobile phone when photographing in front of a mirror, so the mobile phone screen faces the mirror, after the user triggers the upload entry, a timer can be started to start timing, and a preparation time for flipping the mobile phone is reserved for the customer, and image collection is started only when timing duration elapses. The timing duration can be 3 seconds. For ease of understanding by the user, the client can display the timing duration in a count-down method.

This embodiment provides an upload method of insurance application verification data when the user photographs in front of a mirror. On one hand, authenticity of the insurance application verification data can be ensured, and on the other hand, implementation is simple and convenient, and user experience is good.

2. Auxiliary Photographing by Another Person

Figure 9:
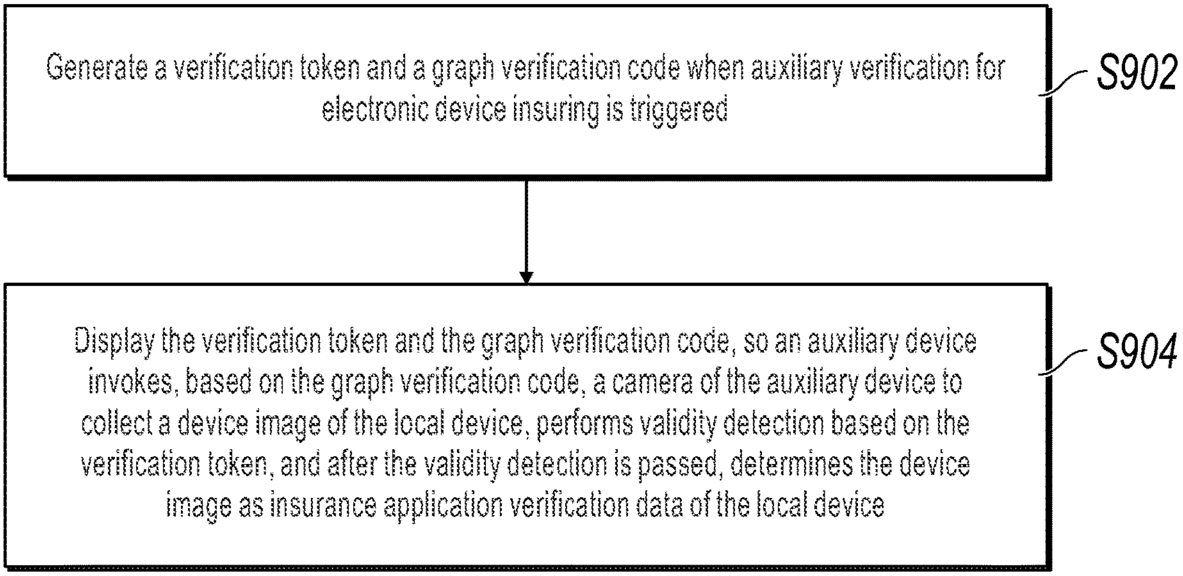
FIG. 9 is a schematic flowchart illustrating an insurance application verification data collection method, according to an example embodiment of this specification.

FIG. 9 is a schematic flowchart illustrating an insurance application verification data collection method, according to an example embodiment of this specification.

The collection method shown in FIG. 9 can be applied to an object device insured this time, and the method includes the following steps: Step 902: Generate a verification token and a graph verification code when auxiliary verification for electronic device insuring is triggered.

Figure 10:
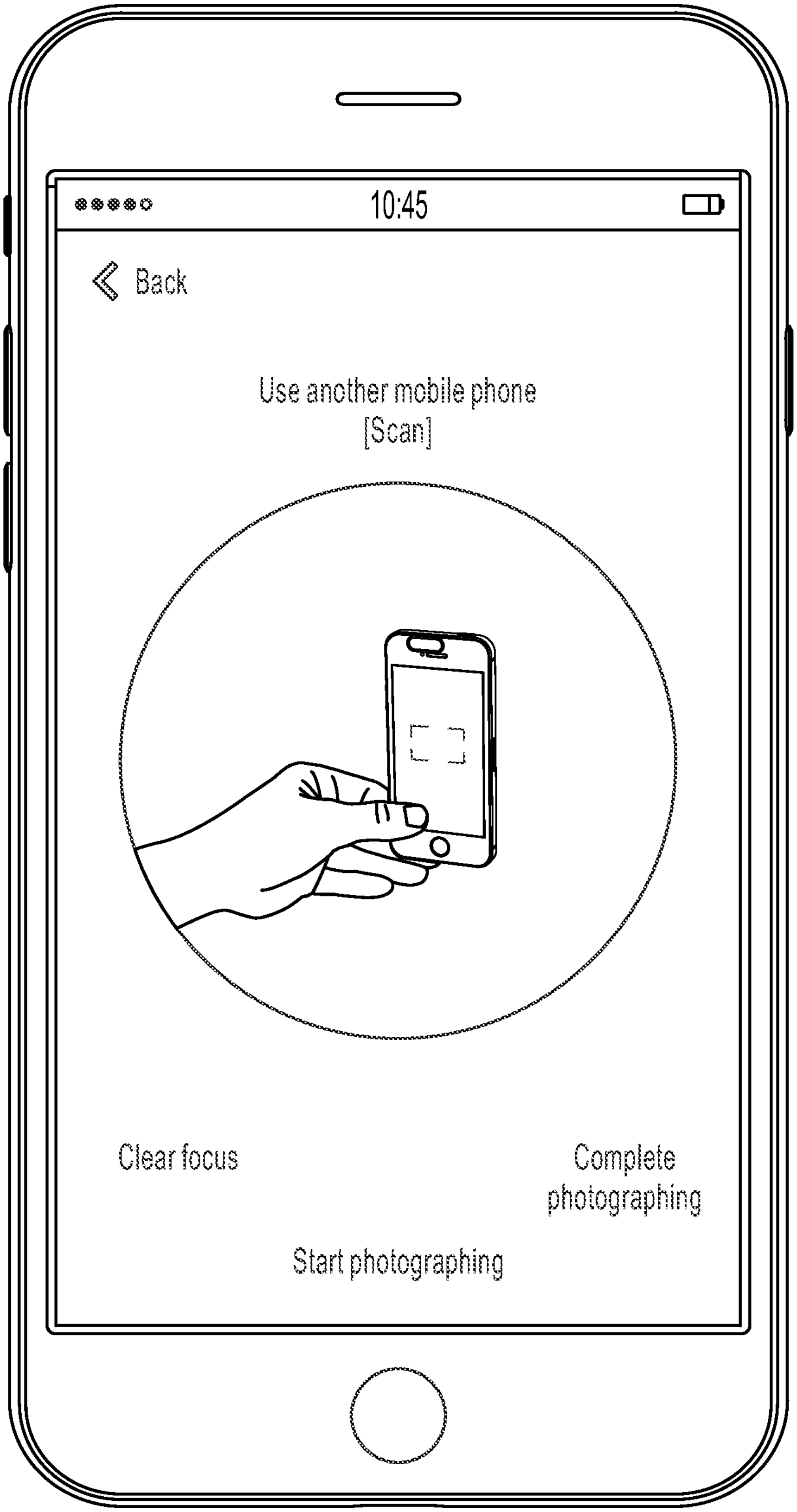
FIG. 10 is a schematic diagram illustrating another upload method guide page, according to an example embodiment of this specification.

Still using the mobile phone screen insurance as an example, if the user triggers, on the page shown in FIG. 6, the upload method of “photographing this mobile phone by using another mobile phone”, the client can jump to the upload method guide page shown in FIG. 10, where the upload method guide page displays an upload entry “start photographing”, and also displays an example image of the upload method and a photographing requirement.

The user triggering the upload entry is considered as triggering auxiliary verification for electronic device insuring, and the client can generate the verification token and the graph verification code.

The graph verification code can be a verification barcode, a verification two-dimensional code, etc. For example, the client can generate a verification two-dimensional code according to data such as a verification identifier, a user account, insuring information, and a device identifier.

The verification token can be a string of characters, such as 6 digits, 8 letters, a combination of 10 digits and letters.

In an example, when the verification token is generated, a current moment can be obtained, and then, based on the current moment, the verification token is generated by using algorithms such as MD5 message-digest algorithm (MD5) and secure hash algorithm 1 (SHA-1).

In another example, when the verification token is generated, the verification token can be generated by using an algorithm such as MD5 based on the current moment and the device identifier.

In another example, the verification token can also be generated based on other information and an algorithm, which is not specifically limited in this specification.

Step 904: Display the verification token and the graph verification code, so an auxiliary device invokes, based on the graph verification code, a camera of the auxiliary device to collect a device image of the local device, performs validity detection based on the verification token, and after the validity detection is passed, determines the device image as insurance application verification data of the local device.

In this embodiment, after auxiliary verification for electronic device insuring is triggered, an insurance application verifying page can be displayed.

In an example, the insurance application verifying page includes only the graph verification code, and the object device can perform page jump after the auxiliary device scans the graph verification code, so as to display the verification token. Or after page jump, the object device can also display the graph verification code and the verification token at the same time.

Figure 11:
FIG. 11 is a schematic diagram illustrating an insurance application verifying page, according to an example embodiment of this specification.

In another example, the insurance application verifying page can include both the graph verification code and the verification token (i.e., the verification token and the graph verification code are displayed on a same page), for example, refer to FIG. 11. After the auxiliary device scans the graph verification code, the object device may not perform page jump, which is not specifically limited in this specification.

Figure 12:
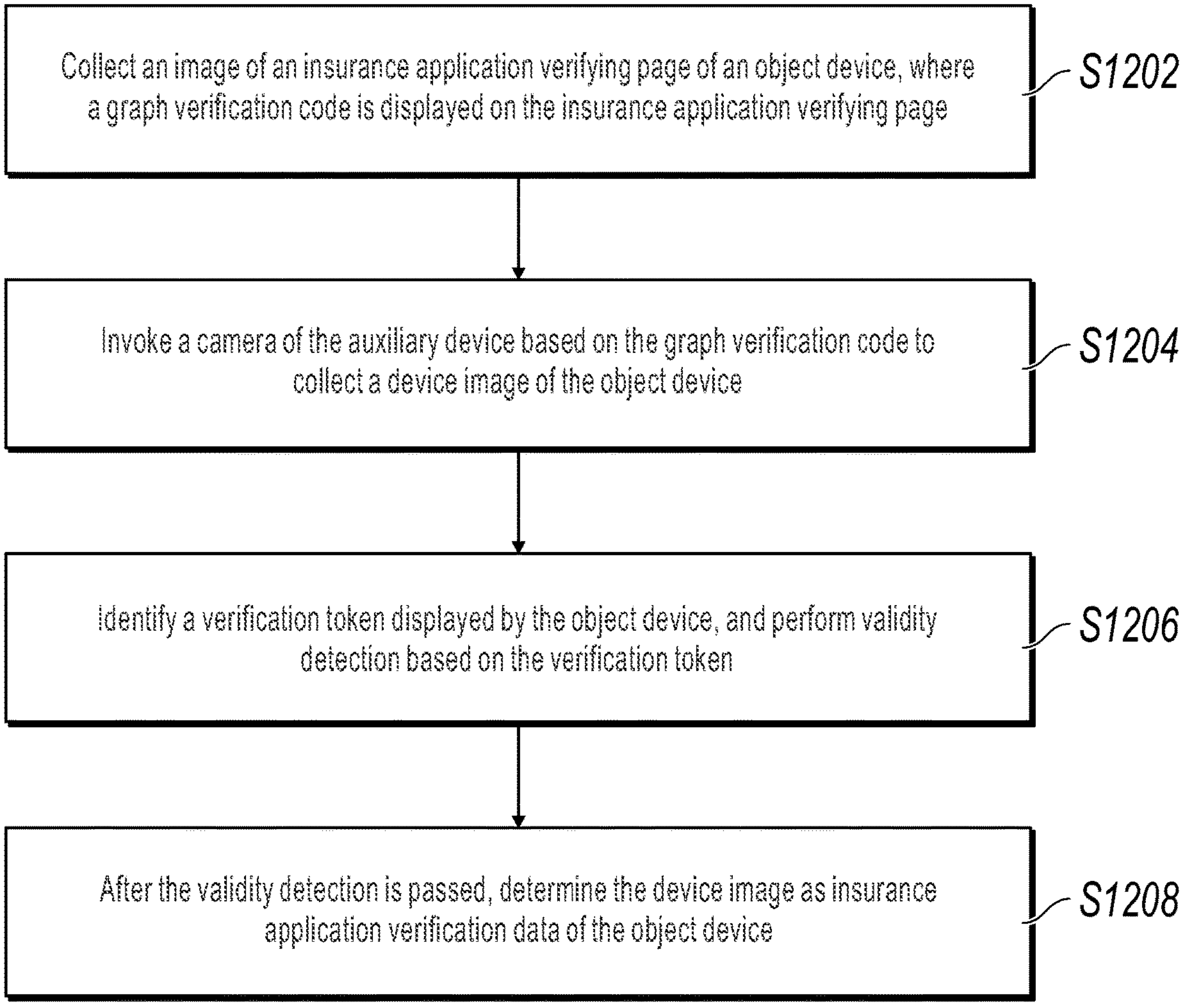
FIG. 12 is a schematic flowchart illustrating another insurance application verification data collection method, according to an example embodiment of this specification.

FIG. 12 is a schematic flowchart illustrating another insurance application verification data collection method, according to an example embodiment of this specification.

The collection method shown in FIG. 12 can be applied to an auxiliary device, and includes the following steps: Step 1202: Collect an image of an insurance application verifying page of an object device, where a graph verification code is displayed on the insurance application verifying page.

Step 1204: Invoke a camera of the auxiliary device based on the graph verification code to collect a device image of the object device.

In this embodiment, after the object device displays the insurance application verifying page, the auxiliary device can be used to collect the image of the insurance application verifying page of the object device.

For example, a user can open a client loaded in the auxiliary device, and then enable “scanning” to collect the image of the insurance application verifying page.

In an example, after collecting the image of the insuring verification page, the auxiliary device can parse the graph verification code displayed on the insuring verification page. If it is obtained by means of parsing that the graph verification code carries a predetermined verification identifier, the auxiliary device can invoke the camera of the auxiliary device to collect an image. The user can adjust a location of the object device or the auxiliary device, so the auxiliary device collects a device image of the object device, that is, a screen image of the object device.

In another example, after collecting the image of the insurance application verifying page, the auxiliary device can send the graph verification code in the image of the insurance application verifying page to a code platform, for example, send a code value of the graph verification code to the code platform. The code platform parses the graph verification code, and after parsing out the predetermined verification identifier, and returns a collection instruction to the auxiliary device, and the auxiliary device invokes, based on the collection instruction, the camera of the auxiliary device to collect the device image of the object device.

The code platform has a function of parsing a graph code. After receiving the graph code sent by the client, the code platform returns different instructions to the client based on a parsing result, for example, a collection instruction of invoking a camera, and a jump instruction of jumping to a payment page.

Step 1206: Identify a verification token displayed by the object device, and perform validity detection based on the verification token.

In this embodiment, the auxiliary device can further identify the verification token from the collected image. For example, the auxiliary device can identify the verification token based on an optical character recognition (OCR) technology, and then perform validity detection based on the verification token.

In one example, the auxiliary device can identify the verification token from the insurance application verifying page.

For example, the graph verification code and the verification token are displayed on the insuring verification page displayed on the object device. After collecting the image of the insuring verification page by means of "scanning", the auxiliary device determines, based on the graph verification code, that it is currently in an auxiliary photographing and verification scenario for electronic device insuring (for example, parses out a predetermined verification identifier from the graph verification code, or receives a collection instruction returned by the code platform), and then identifies, based on the OCR technology, the verification token displayed on the image of the insuring verification page.

In another example, the auxiliary device can identify the verification token from the device image. In this example, it is not limited whether the verification token is displayed on the insurance application verifying page. After collecting the image of the insurance application verifying page, the auxiliary device collects the device image of the object device based on the graph verification code, and can then identify the verification token from the device image by using the OCR technology.

For example, the insuring verification page includes only the graph verification code. After the auxiliary device scans the graph verification code, the object device performs page jump to a page on which the verification token is displayed. The device image of the object device collected by the auxiliary device includes the verification token, and then identification on the verification token is performed.

For another example, the graph verification code and the verification token are displayed on the insuring verification page, and the auxiliary device invokes, based on the graph verification code in the insuring verification page, the camera to collect the image. The object device may not perform page jump, and the device image collected by the auxiliary device still includes the insuring verification page, so the verification token can be identified in the device image.

In practice, after collecting the device image, the auxiliary device can add a parsing identifier to the device image. Subsequently, identification on the verification token can be triggered based on the parsing identifier. For example, for the image obtained after code scanning, if it is determined that the image carries the parsing identifier, the OCR technology can be used to identify the verification token. An image on which verification token identification needs to be performed can be accurately determined by using the parsing identifier, and verification token identification does not need to be performed on all images, thereby greatly reducing a processing resource of the device and improving identification efficiency.

In another example, the object device can also display the verification token based on another policy, and the corresponding auxiliary device can also identify the verification token from another image, which is not specifically limited in this specification.

In this specification, after identifying the verification token, the auxiliary device can parse the verification token by using a corresponding algorithm, obtain a generation moment of the verification token from the verification token, and then perform validity detection based on the generation moment.

In an example, the auxiliary device can obtain a collection moment of the image in which the verification token is located, and then calculate a time difference between the collection moment and the generation moment of the verification token.

If the time difference is greater than predetermined first duration, it indicates that the collection moment of the image in which the verification token is located is a relatively long time from the generation moment of the verification token, that is, after a period of time elapses since the object device displays the verification token, the auxiliary device collects the image, and there can be a risk that the verification token is re-photographed and a photographed insuring verification image is forged data. Further, it can be determined that the verification fails.

If the time difference is less than or equal to the first duration, it can be determined that the validity detection is passed.

The first duration can be 2 seconds, 4 seconds, etc.

In another example, the auxiliary device can send the identified verification token to the server, and the server parses out the generation moment of the verification token, and then calculates a time difference between the generation moment and a sending moment of the verification token.

If the time difference is greater than predetermined second duration, it indicates that the sending moment of the verification token is relatively far from the generation moment of the verification token, and there can be a risk that the verification token is re-photographed and the photographed insuring verification image is forged data. Further, it can be determined that the verification fails.

If the time difference is less than or equal to the second duration, it can be determined that the validity detection is passed.

The second duration is greater than the first duration, for example, can be 10 seconds or 15 seconds.

Certainly, in another example, the auxiliary device can also parse out the generation moment of the verification token, and then send the generation moment to the server. The server can also use a receiving moment of the verification token as a reference, calculate a time difference between the generation moment and the receiving moment of the verification token, and then perform determining. This specification sets no special limitation thereto.

In this embodiment, based on the generation moment of the verification token, validity detection can further be performed with reference to the device identifier.

For example, the object device generates the verification token based on the device identifier and a current moment. On one hand, the auxiliary device can parse out the device identifier from the verification token, and on the other hand, can further parse out the device identifier from the graph verification code. Then, the auxiliary device can determine whether the two device identifiers are the same. If the two device identifiers are the same, the auxiliary device can determine that the device identifier passes the validity detection, and if the time difference also passes the validity detection, the auxiliary device can determine that the device identifier finally passes the validity detection, and then perform a subsequent step. If the two device identifiers are different, even if the time difference passes the validity detection, it can be determined that the validity detection is finally failed, and prompt information of detection identification can be returned to the user.

Step 1208: After the validity detection is passed, determine the device image as insurance application verification data of the object device.

Based on step 1206, after it is determined that the validity detection is passed, the collected device image can be determined as the insurance application verification data of the object device.

In this embodiment, the auxiliary device can further parse out information such as the device identifier, insuring information, and the user account of the object device from the graph verification code, and then send the information and the insurance application verification data to the server. The server can further determine a corresponding insuring request, and perform underwriting. For example, whether the object device screen is intact is determined according to the insurance application verification data.

In this embodiment, the object device can periodically and dynamically update the graph verification code and the verification token. An update period of the verification token is often less than an update period of the graph verification code. For example, to ensure code scanning experience of the user, the graph verification code can be updated every 3 minutes, and to prevent the user from cheating, the verification token can be updated every 2 seconds. For example, the user keeps the graph verification code and the verification token by taking a screenshot and etc., sends the graph verification code and the verification token to a mobile phone of a same model, and subsequently collects, by using the auxiliary device, an image of the mobile phone of the same model to forge insurance application verification data.

It can be understood from the previous description that, in this embodiment, the verification token is used to perform validity detection in a process of collecting insurance application verification data, so cheating operations such as re-photographing and screen snipping can be effectively identified, forged insurance application verification data can be identified, and an electronic device is prevented from "performing insurance application with illness undisclosed". Therefore, the risk of financial loss of insurance companies is effectively reduced, facilitating the promotion of online insurance services.

In another embodiment, the object device can simultaneously display the graph verification code and the verification token on the insurance application verifying page. After the auxiliary device collects the image of the insurance application verifying page by "scanning", the auxiliary device can first identify the verification token and perform validity detection. After determining that the validity detection is passed, the auxiliary device invokes the camera to collect the device image, and determines the collected device image as the insurance application verification data. This is not specially limited in this specification.

In the previous two upload methods, senseless photographing can be used, that is, the user does not need to manually trigger a photographing start/photographing end button, and photos are automatically shot and uploaded after the camera is invoked, thereby simplifying a user operation and improving user experience.

In addition, the previous two methods are described by using the mobile phone screen insurance as an example. If the user applies for another type of insurance, such as comprehensive guarantee insurance, the verification data can further need to include images of the side and the back of the mobile phone, and the client can output a corresponding guide. Details are omitted here for simplicity.

In another example, because the auxiliary devices required in the previous two upload methods are different, the server can pre-store a mapping relationship between an upload method and an upload time period.

In one aspect, when determining that the attribute of the object device is an old device, the server can search, based on the mapping relationship, for an upload method corresponding to a current moment, and add the upload method to prompt information for uploading verification data, and send the prompt information to the user. The server can also add all upload methods to the prompt information and send the prompt information to the user, and preferentially recommend the upload method corresponding to the current moment. This specification sets no special limitation thereto.

In another aspect, when the user triggers uploading of the verification data, the server can also search for the upload method corresponding to the current moment according to the mapping relationship, and then return the upload method to the client. The client can display the upload method differently in the upload method list, for example, mark the upload method as recommended.

Certainly, in this example, the mapping relationship can also be stored locally in the electronic device. When the user triggers uploading of the verification data, the client locally obtains the mapping relationship and searches for the upload method corresponding to the current moment, which is not specifically limited in this specification.

TABLE 1

| Upload period | Upload method |
|---|---|
| 08:00-18:00 | Photographing with another mobile phone |
| 18:00-8:00 | Photographing in front of a mirror |

Referring to Table 1, an example of the mapping relationship between an upload time period and an upload method is provided. In the time period of 8:00-18:00, there is a large probability that the user is at work, and the upload method of photographing with another mobile phone can be preferentially recommended. For example, the user can ask a colleague to perform photographing. From 18:00 to 8:00 on the next day, there is a large probability that the user is at home, and it is recommended to use the upload method of photographing in front of a mirror.

Certainly, the mapping relationship shown in Table 1 is only an example. In practice, a more complex mapping relationship can be further set, for example, distinguishing between a workday and a rest day, which is not specifically limited in this specification.

III. Claim settlement

Figure 13:
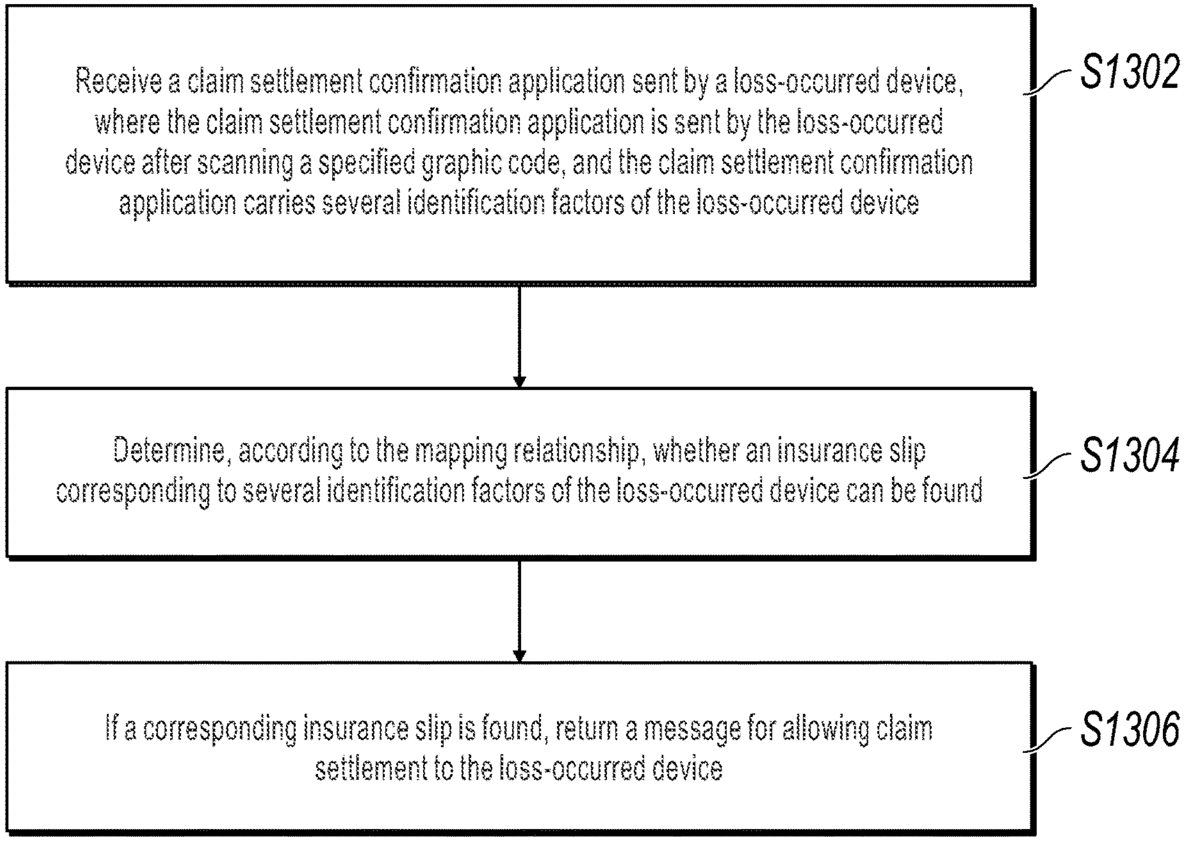
FIG. 13 is a schematic flowchart illustrating an implementation method for insurance claim settlement of an electronic device, according to an example embodiment of this specification.

FIG. 13 is a schematic flowchart illustrating an implementation method for insurance claim settlement of an electronic device, according to an example embodiment of this specification.

Referring to FIG. 13, the implementation method for claim settlement can be applied to a server and includes the following steps: Step 1302: Receive a claim settlement confirmation application sent by a loss-occurred device, where the claim settlement confirmation application is sent by the loss-occurred device after scanning a specified graphic code, and the claim settlement confirmation application carries several identification factors of the loss-occurred device.

In this embodiment, after determining that underwriting is passed, the server can store a mapping relationship between an insurance slip and several identification factors of an electronic device insured by a user.

During claim settlement, the user can scan, by using the electronic device (subsequently referred to as a loss-occurred device) that requires claim settlement, a graphic code used for claim settlement, for example, a two-dimensional code for claim settlement, and the electronic device can further obtain several identification factors of the local device, then construct a claim settlement application based on the several identification factors, and send the claim settlement confirmation application to the server.

For example, after obtaining the electronic device that requires repair and claim settlement, maintenance personnel of the electronic device can log in to the server by using a user account of the maintenance personnel on the client, and then scan the two-dimensional code for claim settlement. The client parses the two-dimensional code for claim settlement. If a specified claim settlement identifier is parsed out, several identification factors of the local device can be obtained, and the step of constructing a claim settlement confirmation application is performed.

In this embodiment, the identification factors of the electronic device can include device identifiers such as identifier for advertising (IDFA), IDFV, and Android ID.

Step 1304: Determine, according to the mapping relationship, whether an insurance slip corresponding to several identification factors of the loss-occurred device can be found.

Step 1306: If a corresponding insurance slip is found, return a message for allowing claim settlement to the loss-occurred device.

After receiving the claim settlement confirmation application, the server can search the mapping relationship for the insurance slip corresponding to the several identification factors carried in the claim settlement confirmation application.

If the corresponding insurance slip is found, it indicates that insurance has purchased previously for the loss-occurred electronic device, and a message for allowing claim settlement can be returned. Subsequently, the maintenance personnel can directly find the insurance company to pay the repair fee.

If the corresponding insurance slip is not found, there can be two cases: One is that no insurance is purchased for the loss-occurred device, and the other is that insurance is not purchased by using the loss-occurred device. Further judgment needs to be made.

It can be learned from the previous description that, in this embodiment, the server can store a mapping relationship between several identification factors of an object device and an insurance slip, and subsequently determine, according to the identification factors of the loss-occurred device, whether the loss-occurred device is insured, so as to verify claim settlement. In one aspect, a combination of several identification factors such as IDFA is used to identify the electronic device, which can effectively alleviate a problem that an application provider cannot obtain a unique device identifier (UDID) to identify the electronic device. On the other hand, in a whole process, the user does not need to manually upload the device identifier such as a UDID, thereby greatly simplifying a user operation and improving insuring experience of the user.

The following separately describes mapping relationship establishment and claim settlement process implementation in detail.

1. Mapping Relationship Establishment

Figure 14:
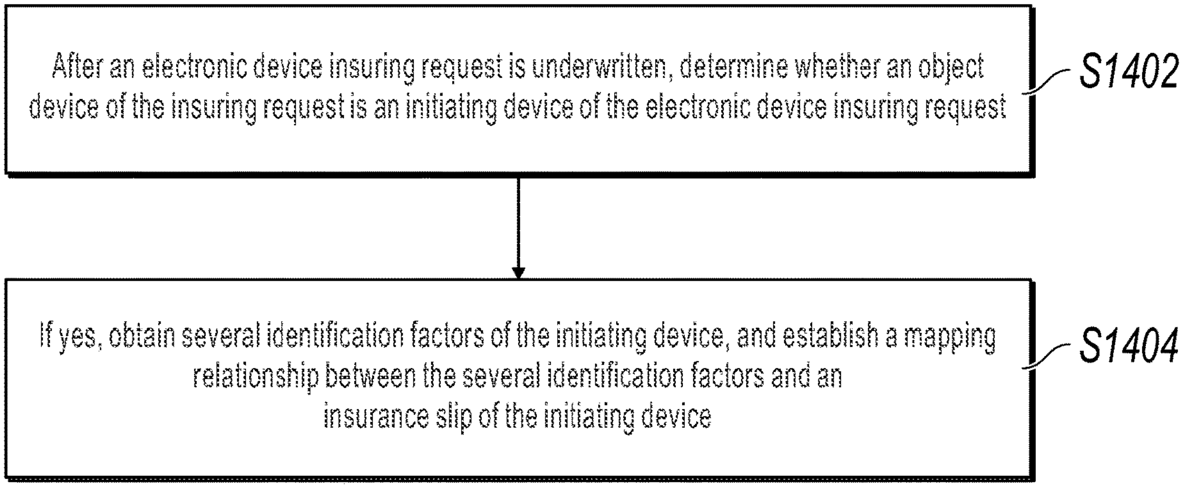
FIG. 14 is a schematic flowchart illustrating a mapping relationship establishment method, according to an example embodiment of this specification.

Referring to FIG. 14, a mapping relationship establishment process can include the following steps:

Step 1402: After an electronic device insuring request is underwritten, determine whether an object device of the insuring request is an initiating device of the electronic device insuring request.

Step 1404: If yes, obtain several identification factors of the initiating device, and establish a mapping relationship between the several identification factors and an insurance slip of the initiating device.

In this embodiment, after determining that the electronic device insuring request is underwritten, the server can determine whether the object device of the insuring request is the initiating device of the electronic device insuring request. That is, the server determines whether the user insures the local device.

If yes, the server can obtain several identification factors of the initiating device by using the client, and establish a mapping relationship between the several identification factors and a corresponding insurance slip. For example, a mapping relationship between the several identification factors and an insurance slip identifier is established.

TABLE 2

| Serial number | IDFA | IDFV | Insurance slip |
|---|---|---|---|
| 1 | 15dfa35g4 | h41f6afg | 123 |
| 2 | 4d5adffs5 | Ghrte15f3 | 124 |
| 3 | D4f3ad4fc | Er5tjkb88 | 125 |

Table 2 shows an example of a mapping relationship between a device identification factor and an insurance slip. It is worthwhile to note that Table 2 is merely an example. In actual implementation, such a table may not be organized, which is not specifically limited in this specification.

In the previous process, the server can determine, by using the following method, whether the object device is the initiating device of the electronic device insuring request.

Method 1: Determine Based on an Attribute of the Object Device

When determining that the attribute of the object device is an old device, the server can determine that the object device is the initiating device of the electronic device insuring request. That is, the user intending to insure has not recently purchased a new electronic device, and the user has also used the initiating device for login.

When determining that the attribute of the object device is a new device, the server can obtain a determining path of the attribute of the new device.

If the determining path is a device identifier determining path, the object device can also be determined as the initiating device of the electronic device insuring request.

For the determining method of the attribute of the new device, refer to the previous embodiments shown in FIG. 2 to FIG. 3. Details are omitted here for simplicity.

Method 2: Determine Based on User Selection

Referring to the insuring page shown in FIG. 4 again, if the user insures by using the insuring page shown in FIG. 4, the server can directly obtain the guaranteed mobile phone selected by the user, and if the user selects the "local mobile phone", the object device can be directly determined as the initiating device of the electronic device insuring request.

In another example, if the object device is not the initiating device of the electronic device insuring request, the server can store a mapping relationship between an insurance slip and a purchase order of the object device, so verification is performed during subsequent claim settlement.

For example, if the determining path of the attribute "new device" of the object device is a historical transaction data path, it can be determined that the object device is not the initiating device of the insuring request.

For another example, FIG. 4 is still used as an example. If the user selects a "newly purchased mobile phone", it can also be determined that the object device is not the initiating device of the insuring request.

In this case, the server can obtain the order identifier of the object device from the historical transaction data of the user, and establish a mapping relationship between the order identifier and the insurance slip identifier, so as to be used for verification during subsequent claim settlement.

Generally, when the object device is not the initiating device of the electronic device insuring request, there are generally two cases. The following uses the mobile phone as an example for description.

The first case is that the user purchases a new device for herself/himself, but uses an old device to insure the new device.

Figure 15:
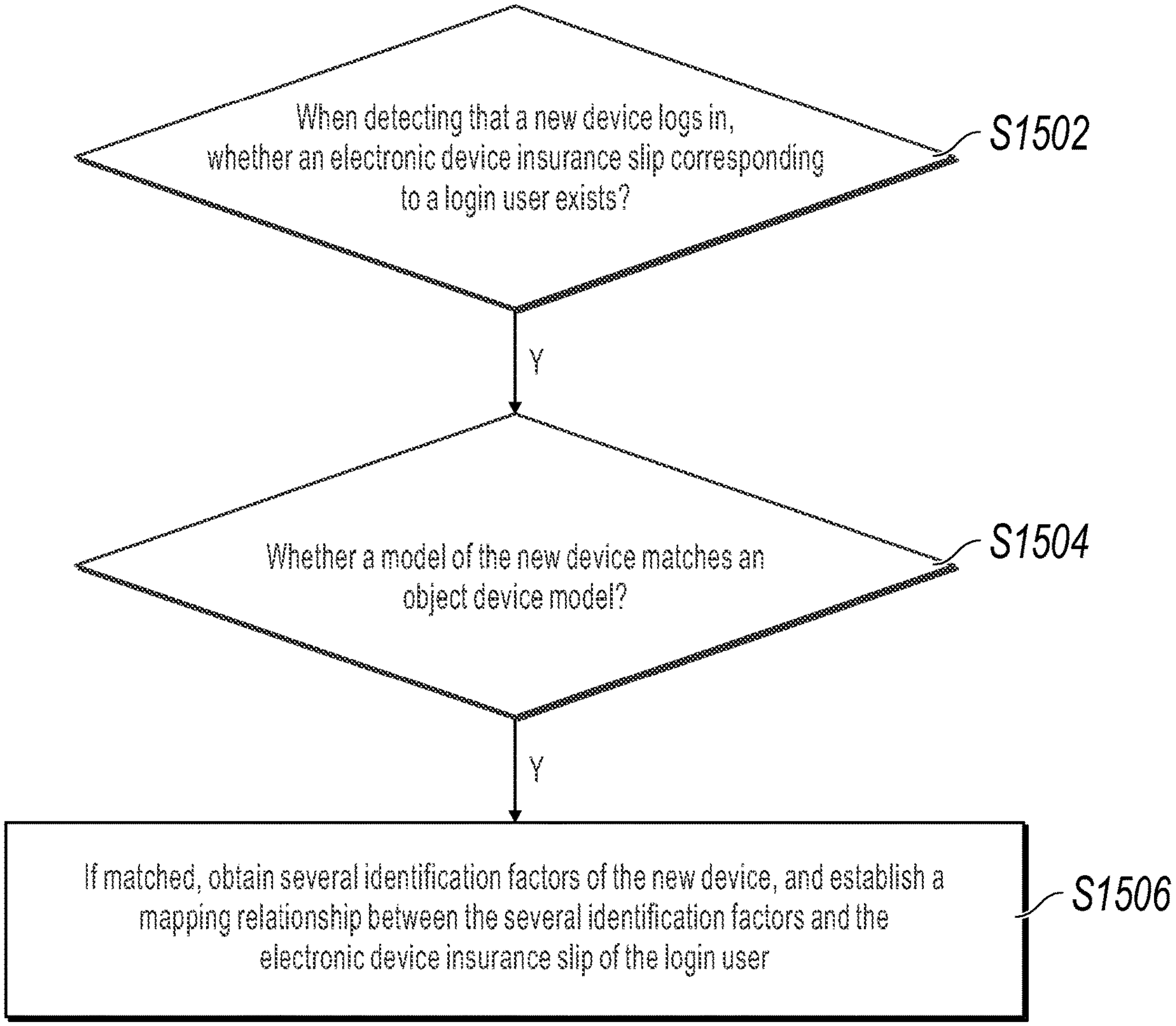
FIG. 15 is a schematic flowchart illustrating another mapping relationship establishment method, according to an example embodiment of this specification.

Referring to FIG. 15, in this case, the previous mapping relationship establishment process can include the following steps: Step 1502: When detecting that a new device logs in, determine whether an electronic device insurance slip corresponding to a login user exists.

In this case, after the user uses the new device, the user usually logs in to the server by using the new device. The server can obtain the identifier of the login mobile phone after the user logs in, and then determines whether the user logs in by using the mobile phone for the first time, that is, whether the new device logs in.

If yes, it can be determined, according to a user account, whether an electronic device insurance slip corresponding to the login user exists, that is, whether the user has purchased mobile phone insurance.

Step 1504: If yes, determine whether a model of the new device matches an object device model.

Step 1506: If matched, obtain several identification factors of the new device, and establish a mapping relationship between the several identification factors and the electronic device insurance slip of the login user.

Based on the determining result in step 1502, if the user has purchased mobile phone insurance, the user can search for the model of the object device according to the insurance slip identifier.

In this embodiment, the server can determine whether the model of the new device used by the user is the object device model.

If matched, it can indicate that the new device currently used by the user is the mobile phone previously insured by the user, and further, several identification factors of the new device can be obtained by using the client, and a mapping relationship between the several identification factors and the insurance slip can be established.

After receiving a claim settlement request for the new device, the server can perform claim settlement verification according to the mapping relationship between the several identification factors and the insurance slip, so as to improve claim settlement verification accuracy.

The second case is that the user purchases a new device for another person, and then insures the new device by using a mobile phone of the user.

In this case, the probability that the user logs in to the user account of the user by using the purchased new device is extremely low, and it is relatively difficult for the server to automatically obtain several identification factors of the new device. Only a mapping relationship between the order identifier and the insurance slip identifier can be established, the user can be prompted to log in by using the new device, and the user can be prompted to actively upload the identification factor of the new device.

2. Claim Settlement Process

In the previous embodiment shown in FIG. 13, when the electronic device requires claim settlement due to damage, the user can directly go to a specified maintenance center, and the maintenance personnel scan a two-dimensional code for verification after logging in to the server by using the loss-occurred device.

Optionally, in another example, when the electronic device requires claim settlement due to damage, the user can also first submit a claim settlement request online. For example, the user can first send the claim settlement request by using the insured electronic device. After receiving the claim settlement request, the server marks a status of a corresponding insurance slip as in claim settlement, and can return a specified maintenance center list to the user.

The user can send the loss-occurred device to the specified maintenance center through face-to-face delivery and express delivery. The maintenance personnel of the specified delivery center can use their own user account to log in to the server and then scan the two-dimensional code for verification.

In such an implementation, after receiving the claim settlement application, the server can find, in a mapping relationship between the insurance slip in the claim settlement status and the identification factor, the insurance slip corresponding to the loss-occurred device, so a quantity of comparisons can be greatly reduced, and claim settlement verification efficiency can be improved.

In another example, after receiving the claim settlement confirmation application sent by the loss-occurred device, the server can obtain login data of the loss-occurred device if a corresponding insurance slip is not found according to several identification factors of the loss-occurred device, for example, a time point at which the loss-occurred device logs in for the first time in history. Then, duration from the time point at which the risk device logs in for the first time to the current time is calculated as first duration, where the first duration can indicate use duration of the loss-occurred device that can be determined by the server.

The server can further obtain, according to the mapping relationship between the order identifier and the insurance slip identifier, an order corresponding to the insurance slip in claim settlement status, and then calculate duration from a generation time point of the order to the current time as second duration, where the second duration represents purchase duration of the electronic device with an insurance slip.

Then, the server can determine a size relationship between the first duration and each second duration. If the first duration is longer than all the second duration, it can indicate that the use duration of the loss-occurred device is greater than the purchase duration of each insured electronic device. Thus, there is a suspicion of insurance fraud, and a message for prohibiting claim settlement can be returned to the loss-occurred device.

If the first duration is less than all the second duration, a message for allowing claim settlement can be returned to the loss-occurred device.

It is worthwhile to note that, in a process of duration determining, whether the model of the object device matches the model of the loss-occurred device can be further determined. Details are omitted here for simplicity.

It can be learned from the previous description that, in the claim settlement solution provided in this embodiment, when the user insures the new device, the mapping relationship between the purchase order and the insurance slip of the new device can be stored. Subsequently, claim settlement verification can be performed according to the purchase duration of the new device and the use duration of the loss-occurred mobile phone. When an insuring/claim settlement operation is simplified, claim settlement verification accuracy can be further ensured.

Figure 16:
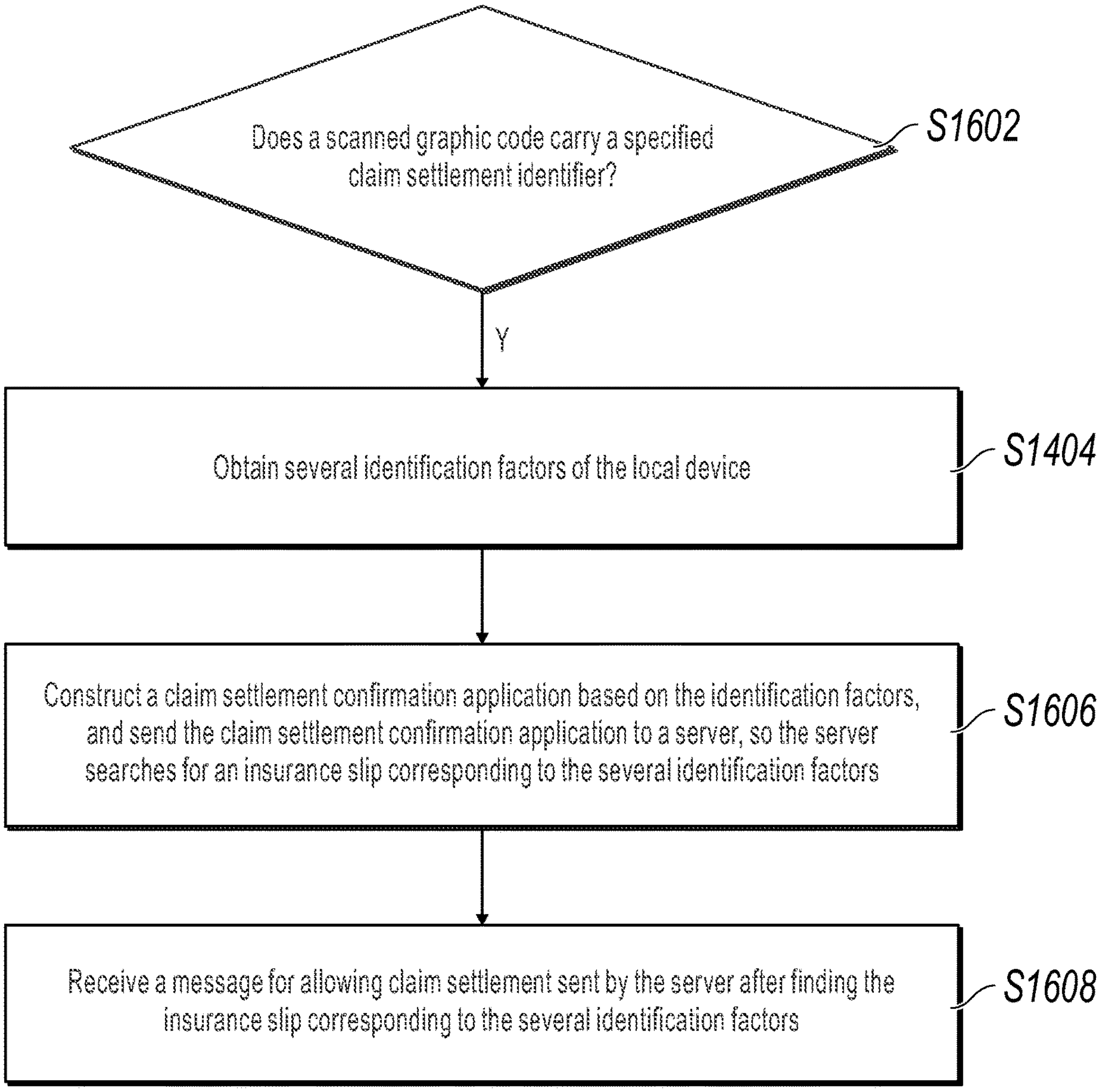
FIG. 16 is a schematic flowchart illustrating another implementation method for insurance claim settlement of an electronic device, according to an example embodiment of this specification.

FIG. 16 is a schematic flowchart illustrating another implementation method for insurance claim settlement of an electronic device, according to an example embodiment of this specification.

Referring to FIG. 16, the implementation method for claim settlement can be applied to an electronic device, and includes the following steps: Step 1602: After scanning a graphic code, determine whether the graphic code carries a specified claim settlement identifier.

Step 1604: If carried, obtain several identification factors of the local device.

Step 1606: Construct a claim settlement confirmation application based on the identification factors, and send the claim settlement confirmation application to a server, so the server searches for an insurance slip corresponding to the several identification factors.

Step 1608: Receive a message for allowing claim settlement sent by the server after finding the insurance slip corresponding to the several identification factors.

For the implementation method for claim settlement in this embodiment, refer to the previous embodiment. Details are omitted here for simplicity.

IV. Determining of an Insurance Parameter

This specification provides a solution for dynamically determining an insurance parameter, so as to flexibly determine insurance parameters of different users. The implementation is simple and convenient, effectively improving insuring experience of a user.

The insurance parameter can include one or more of a coverage amount, a coverage period, a coverage range, and a coverage type.

Figure 17:
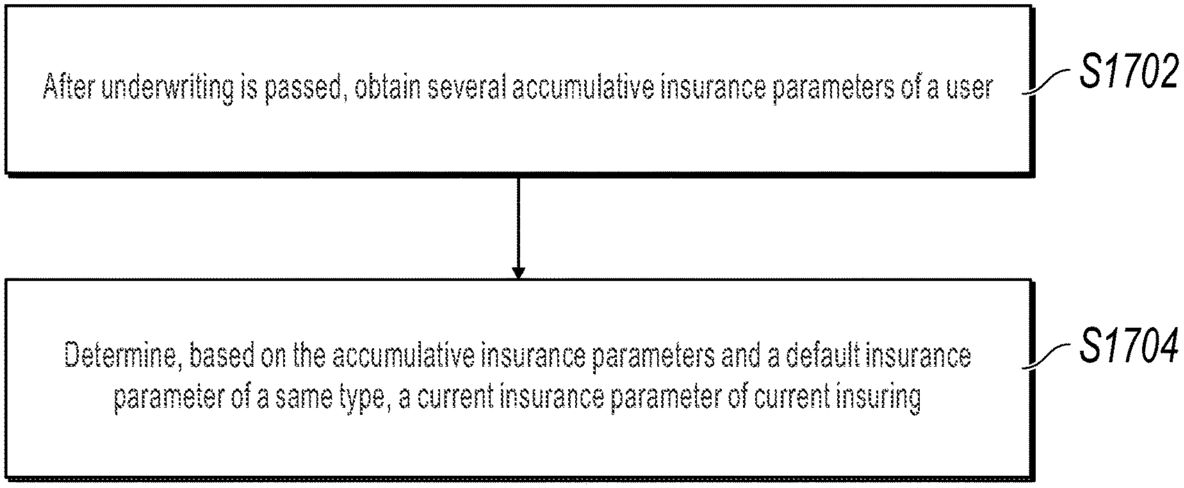
FIG. 17 is a schematic flowchart illustrating an insurance parameter determining method, according to an example embodiment of this specification.

FIG. 17 is a schematic flowchart illustrating an insurance parameter determining method, according to an example embodiment of this specification.

Referring to FIG. 17, the insurance parameter determining method can be applied to a server and includes the following steps: Step 1702: After underwriting is passed, obtain several accumulative insurance parameters of a user.

In this embodiment, after it is determined that electronic device insurance underwriting is passed, it can be determined, based on a mapping relationship between a user and an accumulative insurance parameter, whether the user has a corresponding accumulative insurance parameter.

If existent, the accumulative insurance parameter corresponding to the user can be obtained.

If not existent, an insurance parameter of current insuring by the user can be determined as a default insurance parameter.

Step 1704: Determine, based on the accumulative insurance parameters and a default insurance parameter of a same type, a current insurance parameter of current insuring.

Based on step 1702, after the accumulative insurance parameters of the user are obtained, the accumulative insurance parameter can be added to the default insurance parameter of the same type, to obtain an insurance parameter of a type corresponding to the current insuring.

Take screen insurance of an electronic device as an example. Assume that a default coverage amount is RMB 1000 and a default coverage period is 1 year.

If an accumulative coverage amount corresponding to the user is RMB 20, and the accumulative coverage period is one month, the coverage amount of the current insuring by the user can be determined as RMB 1020, and the coverage period can be determined as one year and one month.

If the accumulative coverage amount corresponding to the user is RMB 10, and there is no corresponding accumulative converge period, the coverage amount of the current insuring by the user can be determined as RMB 1010, and the coverage period can be determined as 1 year.

If the accumulative coverage amount and accumulative coverage period corresponding to the user do not exist, the coverage amount of the current insuring by the user can be determined as a default coverage amount RMB 1000, and the coverage period can be determined as a default coverage period one year.

In this embodiment, after successfully executing a payment request of the user, the server can send, to the user, a message for obtaining the accumulative insurance parameter. That is, after the user successfully completes payment, the server sends the message to the user. After obtaining the message, the client can display, in a payment result page, an entry for obtaining the accumulative insurance parameter.

A type of the accumulative insurance parameter can be specified by the server, and can be added to the message by the server.

For example, the server can specify the type of the accumulative insurance parameter as the coverage period, and the client can further display an entry for obtaining the accumulative coverage period in the payment result page.

For another example, the server can specify the type of the accumulative insurance parameter as the coverage amount and the coverage period, and the client can further display an entry for obtaining the accumulative coverage amount and an entry for obtaining the accumulative coverage period in the payment result page.

In this embodiment, the user can trigger the obtaining entry by using the payment result page, and the client can send a corresponding type of accumulative insurance parameter obtaining request to the server.

An accumulative coverage amount obtaining request is used as an example. After receiving the accumulative coverage amount obtaining request, the server can determine whether a corresponding electronic device insurance slip exists for the user.

If existent, it can indicate that the user has purchased electronic device insurance, and the server can obtain a current coverage amount corresponding to the insurance slip, then calculate a sum of the accumulative coverage amount and the current coverage amount, and update the current coverage amount of the insurance slip with the sum.

Specific values of accumulative coverage amounts of different users can be the same. For example, accumulative coverage amounts of all users are RMB 10. Specific values of accumulative coverage amounts of different users can alternatively be different. The server can determine a specific value of the accumulative coverage amount of the user according to a payment amount of the user. For example, the accumulative coverage amount of a user whose payment amount is higher has a higher specific value; or the accumulative coverage amount of a user whose payment amount is greater than or equal to a threshold is RMB 20, and the accumulative coverage amount of a user whose payment amount is less than the threshold is RMB 10. This is not specifically limited in this specification.

If the electronic device insurance slip corresponding to the user does not exist, it can indicate that the user has not purchased electronic device insurance. The server can store a mapping relationship between the user and the accumulative coverage amount and a value thereof. When the user subsequently purchases electronic device insurance, the coverage amount of the insurance slip can be determined based on the mapping relationship.

In this embodiment, the accumulative insurance parameter can have valid duration.

The coverage amount is used as an example. The effective duration can be predetermined to be less than or equal to the coverage period. Assume that the valid duration is six-months, when the valid duration reaches six months, if the insurance slip does not exceed the coverage period, the coverage amount can be restored for the insurance slip, for example, a difference between a specific value of a current coverage amount of the insurance slip and a specific value of a corresponding accumulative coverage amount can be calculated, and the difference is updated as the current coverage amount of the insurance slip.

The coverage period is used as an example. Effective duration of the coverage period is usually for an uninsured user. When the effective duration arrives, if the user still does not purchase electronic device insurance, it can be determined that the coverage period is invalid.

In another example, the accumulative insurance parameter can also be provided only for a user who has purchased electronic device insurance.

For example, after a payment request of a user is successfully executed, it can be determined whether an insurance slip corresponding to the user exists. If existent, a message for obtaining an accumulative insurance parameter can be sent to the user, and the client further displays, on a payment result page, an entry for obtaining the accumulative insurance parameter.

When the user triggers the obtaining entry, the server updates the insurance parameter.

If the insurance slip corresponding to the user does not exist, the server does not send the user the message for obtaining the accumulative insurance parameter, and the client does not display the entry for obtaining the accumulative insurance parameter.

It can be understood from the previous description that, in this embodiment, the entry for obtaining the accumulative insurance parameter can be displayed on the payment result page, and the user can trigger updating of the insurance parameter based on the obtaining entry. Technology innovation implements simple and convenient insuring, provides a quick and convenient insuring service recommendation for the user, reduces complexity of a user operation, and reduces operation time of the user.

This specification further provides an embodiment of a verification apparatus for electronic device insuring.

Figure 18:
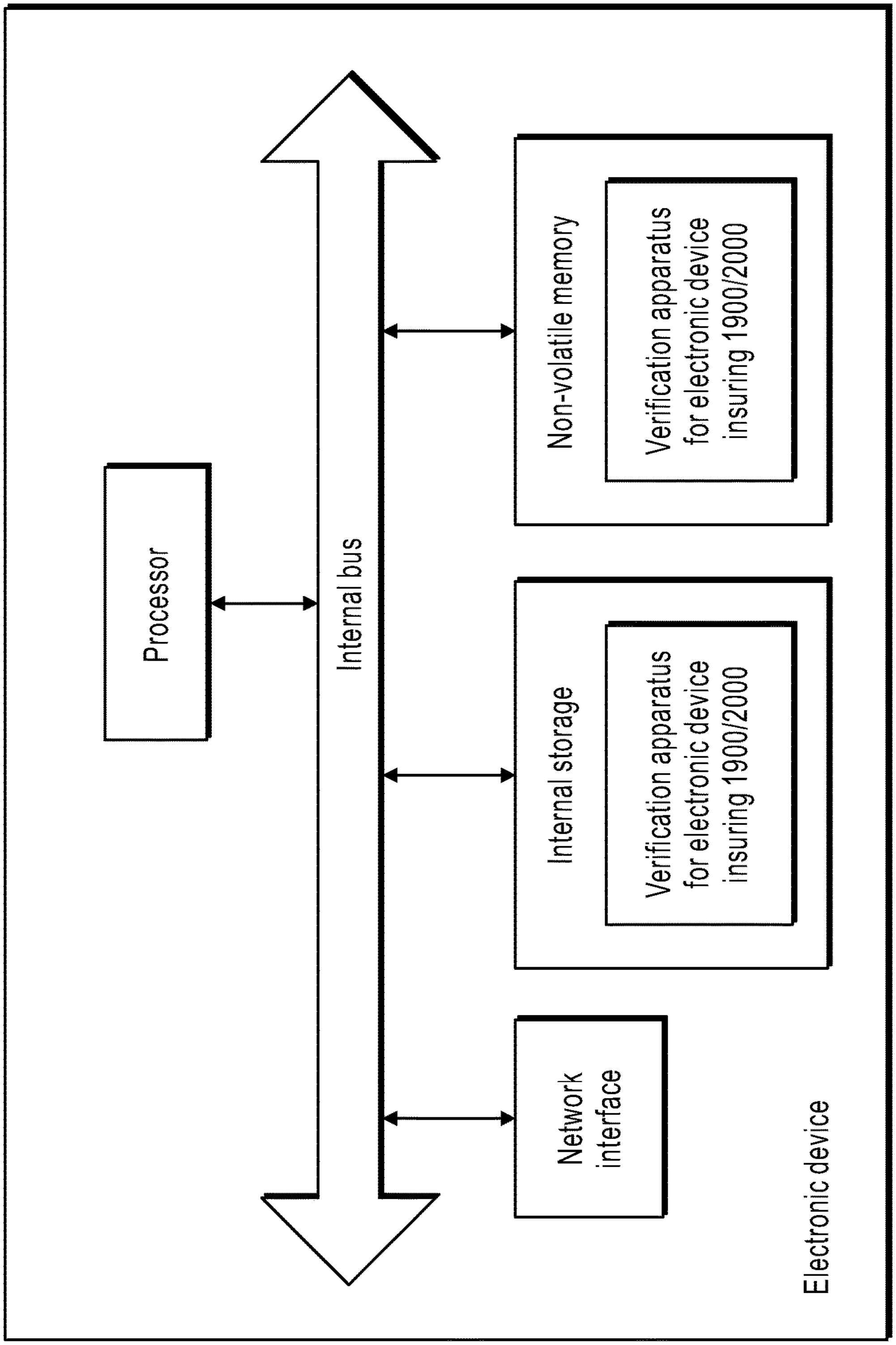
FIG. 18 is a schematic structural diagram of a verification apparatus for electronic device insuring, according to an example embodiment of this specification.

An embodiment of a verification apparatus for electronic device insuring in this specification can be applied to an electronic device. The apparatus embodiment can be implemented by software, hardware, or a combination of hardware and software. Software implementation is used as an example. As a logical device, the device is formed by reading a corresponding computer program instruction in a non-volatile memory to a memory by a processor of an electronic device where the device is located. In terms of hardware, referring to FIG. 18, FIG. 18 is a structural hardware diagram illustrating an electronic device that the verification apparatus for electronic device insuring is located in this specification. In addition to a processor, a memory, a network interface, and a non-volatile memory shown in FIG. 18, the electronic device that the apparatus is located in the embodiments can usually include other hardware based on an actual function of the electronic device. Details are omitted here.

Figure 19:
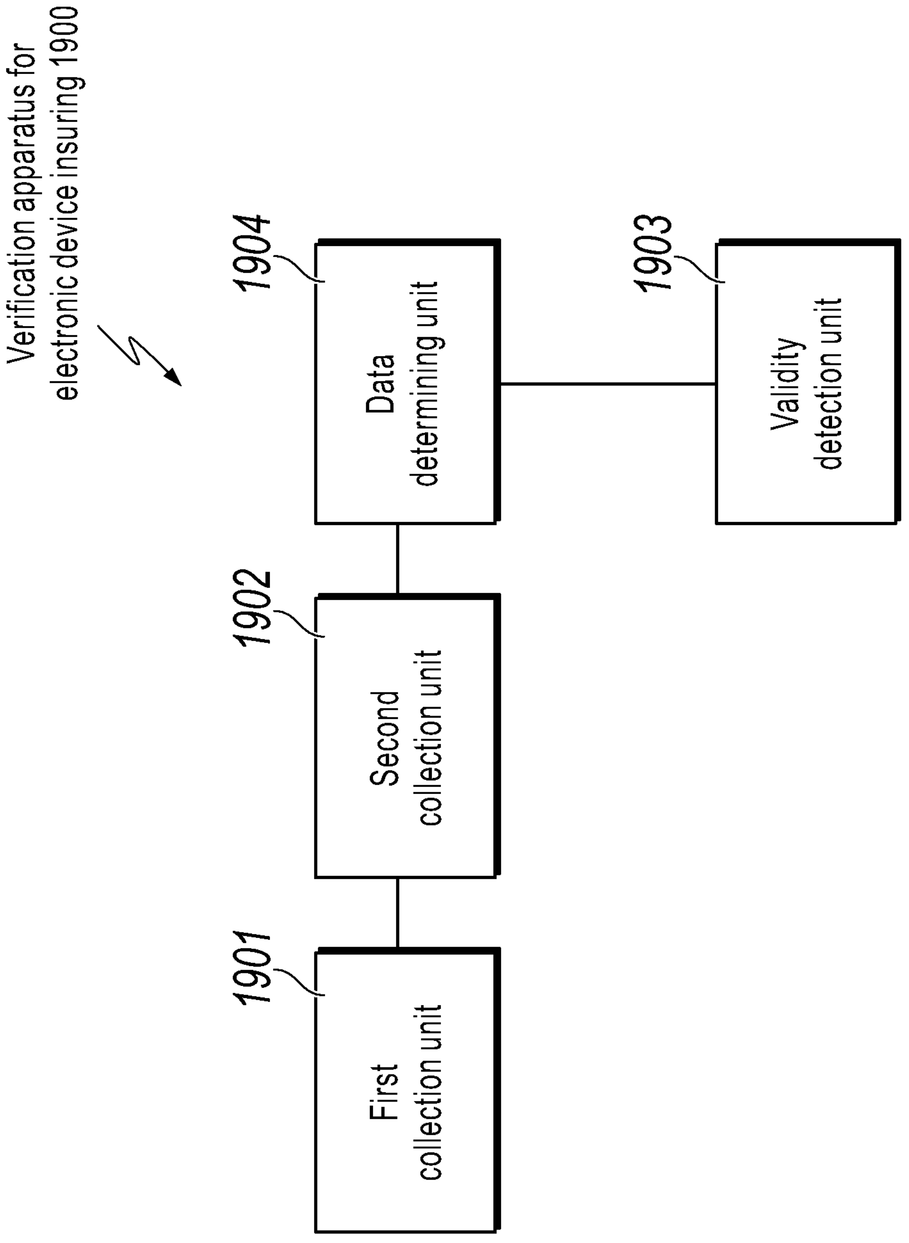
FIG. 19 is a block diagram of a verification apparatus for electronic device insuring, according to an example embodiment of this specification.

FIG. 19 is a block diagram of a verification apparatus for electronic device insuring, according to an example embodiment of this specification.

Referring to FIG. 19, the verification apparatus 1900 for electronic device insuring can be applied to the previous electronic device shown in FIG. 18. The electronic device serves as an auxiliary device, and includes a first collection unit 1901, a second collection unit 1902, a validity detection unit 1903, and a data determining unit 1904.

The first collection unit 1901 is configured to collect an image of an insurance application verifying page of an object device, where a graph verification code is displayed on the insurance application verifying page; the second collection unit 1902 is configured to invoke a camera of the auxiliary device based on the graph verification code to collect a device image of the object device; the validity detection unit 1903 is configured to: identify a verification token displayed by the object device, and perform validity detection based on the verification token; and the data determining unit 1904 is configured to: after the validity detection is passed, determine the device image as insurance application verification data of the object device.

Optionally, the validity detection unit 1903 is configured to: parse out a generation moment of the verification token from the verification token; obtain a collection moment of the image of the insurance application verifying page; determine whether a time difference between the collection moment and the generation moment is less than or equal to first duration; and if yes, determine that the validity detection is passed.

Optionally, the validity detection unit 1903 is configured to: send the verification token to a server, so the server parses out a generation moment of the verification token, and determines whether a time difference between the generation moment and a sending moment of the verification token is less than or equal to second duration; and receive a validity detection pass message returned by the server, where the validity detection pass message is sent by the server when determining that the time difference is less than or equal to the second duration; and the second duration is longer than first duration.

Optionally, the validity detection unit 1903 is configured to: parse out a first device identifier from the verification token; and parse out a second device identifier from the graph verification code; where the performing validity detection based on the verification token includes: determining whether the first device identifier and the second device identifier are the same; and if same, determining that the validity detection is passed.

Optionally, the validity detection unit 1903 is configured to: identify the verification token from the image of the insurance application verifying page by using an OCR technology.

Optionally, the validity detection unit 1903 is configured to: identify the verification token from the device image by using an OCR technology.

Optionally, the second collection unit 1902 is configured to: after the image of the insurance application verifying page is collected, send the graph verification code to a code platform; and in response to the code platform returning a collection instruction after parsing the graph verification code, invoke the camera of the auxiliary device to collect the device image of the object device.

Figure 20:
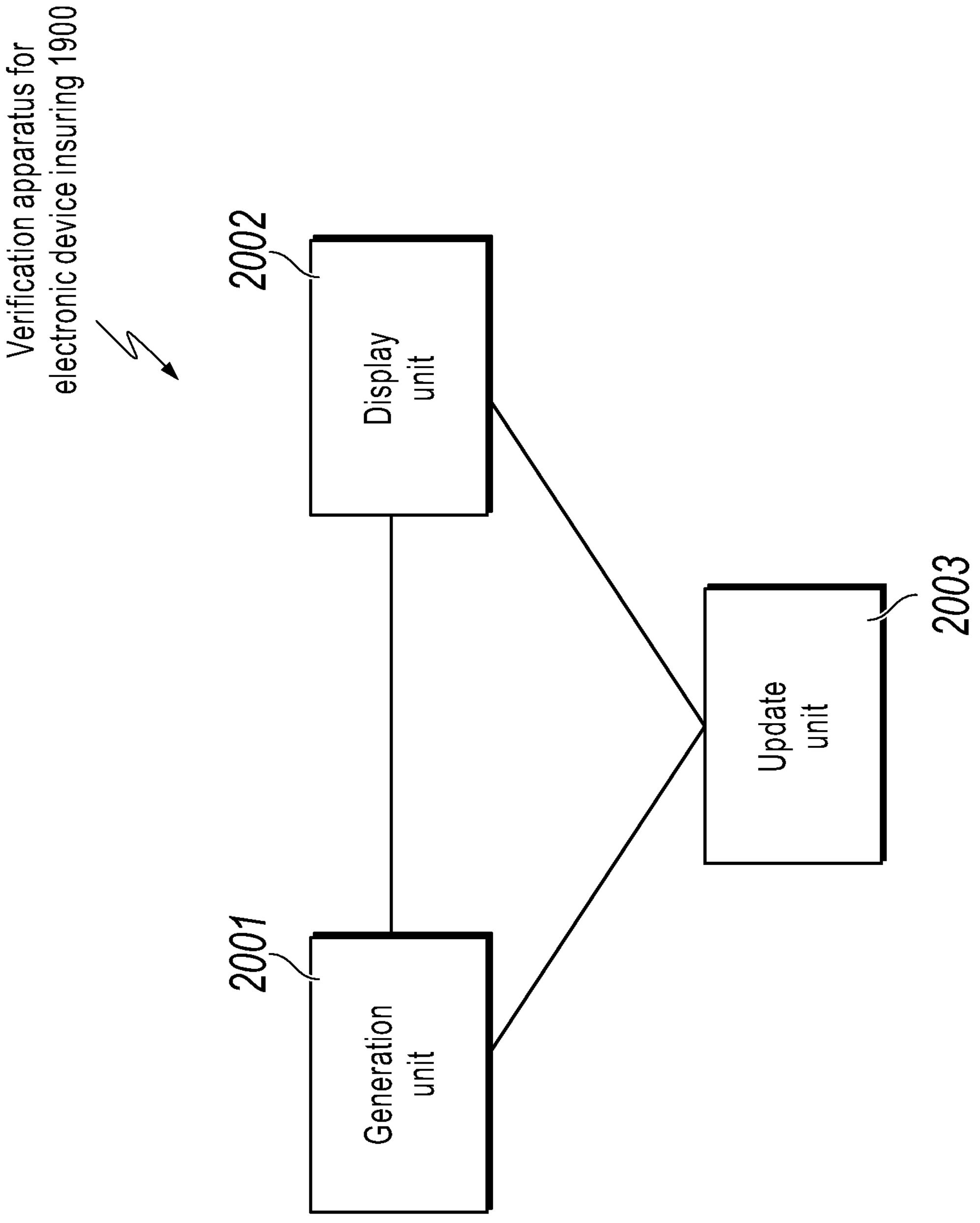
FIG. 20 is a block diagram of another verification apparatus for electronic device insuring, according to an example embodiment of this specification.

FIG. 20 is a block diagram of another verification apparatus for electronic device insuring, according to an example embodiment of this specification.

Referring to FIG. 20, the verification apparatus 2000 for electronic device insuring can be applied to the previous electronic device shown in FIG. 18. The electronic device serves as an object device, and includes a generation unit 2001, a display unit 2002, and an update unit 2003.

The generation unit 2001 is configured to generate a verification token and a graph verification code when auxiliary verification for electronic device insuring is triggered; and the display unit 2002 is configured to display the verification token and the graph verification code, so an auxiliary device invokes, based on the graph verification code, a camera of the auxiliary device to collect a device image of the local device, performs validity detection based on the verification token, and after the validity detection is passed, determines the device image as insurance application verification data of the local device.

Optionally, the generation unit 2001 is configured to: generate the verification token based on a current moment.

Optionally, the generation unit 2001 is configured to: generate the verification token based on a current moment and a device identifier of the local device.

The update unit 2003 is configured to periodically update the displayed verification token.

Optionally, an update period of the verification token is less than an update period of the graph verification code.

Optionally, the verification token and the graph verification code are displayed on a same page.

For an implementation process of functions and roles of each unit in the apparatus, references can be made to an implementation process of corresponding steps in the previous method. Details are omitted here.

Because an apparatus embodiment corresponds to a method embodiment, for related parts, references can be made to related descriptions in the method embodiment. The apparatus embodiment described above is merely an example. The units described as separate parts can or cannot be physically separate, and parts displayed as units can or cannot be physical units, can be located in one position, or can be distributed on a plurality of network units. Some or all of the modules can be selected based on actual needs to achieve the objectives of the solutions of this specification. A person of ordinary skill in the art can understand and implement the embodiments of this application without creative efforts.

The system, apparatus, module, or unit illustrated in the previous embodiments can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

This specification further provides a verification apparatus for electronic device insuring, and the apparatus includes a processor and a memory configured to store machine executable instructions. The processor and the memory are generally connected to each other by using an internal bus. In another possible implementation, the device can further include an external interface capable of communicating with another device or component.

In this embodiment, by reading and executing the machine executable instructions that are stored in the memory and that are corresponding to a verification logic of electronic device insuring, the processor is enabled to: collect an image of an insurance application verifying page of an object device, where a graph verification code is displayed on the insurance application verifying page; invoke a camera of the auxiliary device based on the graph verification code to collect a device image of the object device; identify a verification token displayed by the object device, and perform validity detection based on the verification token; and after the validity detection is passed, determine the device image as insurance application verification data of the object device.

Optionally, the performing validity detection based on the verification token includes: parsing out a generation moment of the verification token from the verification token; obtaining a collection moment of the image of the insurance application verifying page; determining whether a time difference between the collection moment and the generation moment is less than or equal to first duration; and if yes, determining that the validity detection is passed.

Optionally, the performing validity detection based on the verification token includes: sending the verification token to a server, so the server parses out a generation moment of the verification token, and determines whether a time difference between the generation moment and a sending moment of the verification token is less than or equal to second duration; and receiving a validity detection pass message returned by the server, where the validity detection pass message is sent by the server when determining that the time difference is less than or equal to the second duration; and the second duration is longer than first duration.

Optionally, the method further includes: parsing out a first device identifier from the verification token; and parsing out a second device identifier from the graph verification code; where the performing validity detection based on the verification token includes: determining whether the first device identifier and the second device identifier are the same; and if same, determining that the validity detection is passed.

Optionally, the identifying the verification token includes: identifying the verification token from the image of the insurance application verifying page by using an OCR technology.

Optionally, the identifying the verification token includes: identifying the verification token from the device image by using an OCR technology.

Optionally, the invoking, based on the graph verification code, a camera of the auxiliary device to collect a device image of the object device includes: after the image of the insurance application verifying page is collected, sending the graph verification code to a code platform; and in response to the code platform returning a collection instruction after parsing the graph verification code, invoking the camera of the auxiliary device to collect the device image of the object device.

This specification further provides a verification apparatus for electronic device insuring, and the apparatus includes a processor and a memory configured to store machine executable instructions. The processor and the memory are generally connected to each other by using an internal bus. In another possible implementation, the device can further include an external interface capable of communicating with another device or component.

In this embodiment, by reading and executing the machine executable instructions that are stored in the memory and that are corresponding to a verification logic of electronic device insuring, the processor is enabled to: generate a verification token and a graph verification code when auxiliary verification for electronic device insuring is triggered; and display the verification token and the graph verification code, so an auxiliary device invokes, based on the graph verification code, a camera of the auxiliary device to collect a device image of the local device, performs validity detection based on the verification token, and after the validity detection is passed, determines the device image as insurance application verification data of the local device.

Optionally, the generating a verification token includes: generating the verification token based on a current moment.

Optionally, the generating a verification token includes: generating the verification token based on a current moment and a device identifier of the local device.

Optionally, the method further includes: periodically updating the displayed verification token.

Optionally, an update period of the verification token is less than an update period of the graph verification code.

Optionally, the verification token and the graph verification code are displayed on a same page.

This specification further provides a computer readable storage medium. The computer readable storage medium stores a computer program. When being executed by a processor, the program implements the following steps: collecting an image of an insurance application verifying page of an object device, where a graph verification code is displayed on the insurance application verifying page; invoking a camera of an auxiliary device based on the graph verification code to collect a device image of the object device; identifying a verification token displayed by the object device, and performing validity detection based on the verification token; and after the validity detection is passed, determining the device image as insurance application verification data of the object device.

Optionally, the performing validity detection based on the verification token includes: parsing out a generation moment of the verification token from the verification token; obtaining a collection moment of the image of the insurance application verifying page; determining whether a time difference between the collection moment and the generation moment is less than or equal to first duration; and if yes, determining that the validity detection is passed.

Optionally, the performing validity detection based on the verification token includes: sending the verification token to a server, so the server parses out a generation moment of the verification token, and determines whether a time difference between the generation moment and a sending moment of the verification token is less than or equal to second duration; and receiving a validity detection pass message returned by the server, where the validity detection pass message is sent by the server when determining that the time difference is less than or equal to the second duration; and the second duration is longer than first duration.

Optionally, the method further includes: parsing out a first device identifier from the verification token; and parsing out a second device identifier from the graph verification code; where the performing validity detection based on the verification token includes: determining whether the first device identifier and the second device identifier are the same; and if same, determining that the validity detection is passed.

Optionally, the identifying the verification token includes: identifying the verification token from the image of the insurance application verifying page by using an OCR technology.

Optionally, the identifying the verification token includes: identifying the verification token from the device image by using an OCR technology.

Optionally, the invoking, based on the graph verification code, a camera of the auxiliary device to collect a device image of the object device includes: after the image of the insurance application verifying page is collected, sending the graph verification code to a code platform; and in response to the code platform returning a collection instruction after parsing the graph verification code, invoking the camera of the auxiliary device to collect the device image of the object device.

This specification further provides a computer readable storage medium, where the computer readable storage medium stores a computer program. When being executed by a processor, the program implements the following steps: generating a verification token and a graph verification code when auxiliary verification for electronic device insuring is triggered; and displaying the verification token and the graph verification code, so an auxiliary device invokes, based on the graph verification code, a camera of the auxiliary device to collect a device image of the local device, performs validity detection based on the verification token, and after the validity detection is passed, determines the device image as insurance application verification data of the local device.

Optionally, the generating a verification token includes: generating the verification token based on a current moment.

Optionally, the generating a verification token includes: generating the verification token based on a current moment and a device identifier of the local device.

Optionally, the method further includes: periodically updating the displayed verification token.

Optionally, an update period of the verification token is less than an update period of the graph verification code.

Optionally, the verification token and the graph verification code are displayed on a same page.

Specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or can be advantageous.

The previous descriptions are merely preferred embodiments of this specification, but are not intended to limit this specification. Any modification, equivalent replacement, or improvement made without departing from the spirit and principle of this specification shall fall within the protection scope of this specification.

What is claimed is:

1. A computer-implemented method for verification of electronic device insuring, comprising:

collecting, by an auxiliary device, an image of an insurance application verifying page of an object device, wherein a graph verification code and verification token are separately displayed on the insurance application verifying page, wherein the object device periodically and dynamically updates the graph verification code and the verification token, and an update period of the verification token is less than an update period of the graph verification code;

invoking, by the auxiliary device, a camera of the auxiliary device based on the graph verification code to collect a device image of the object device;

identifying, by the auxiliary device, the verification token displayed by the object device;

performing, by the auxiliary device, validity detection based on the verification token; and determining, by the auxiliary device, the device image as insurance application verification data of the object device.

2. The computer-implemented method of claim 1, wherein performing, by the auxiliary device, validity detection based on the verification token, comprises:

parsing out a generation moment of the verification token from the verification token;

obtaining a collection moment of the image of the insurance application verifying page;

determining whether a time difference between the collection moment and the generation moment is less than or equal to a first duration; and if the time difference between the collection moment and the generation moment is less than or equal to a first duration, determining that the validity detection is passed.

3. The computer-implemented method of claim 1, wherein performing, by the auxiliary device, validity detection based on the verification token comprises:

sending, to a server, the verification token, wherein the server:

parses out a generation moment of the verification token; and determines whether a time difference between the generation moment and a sending moment of the verification token is less than or equal to a second duration;

receiving, from the server, a validity detection pass message, wherein:

the validity detection pass message is sent by the server when determining that the time difference is less than or equal to the second duration; and the second duration is longer than first duration.

4. The computer-implemented method of claim 1, further comprising:

parsing out a first device identifier from the verification token;

parsing out a second device identifier from the graph verification code; and performing, by the auxiliary device, validity detection based on the verification token, comprising:

determining whether the first device identifier and the second device identifier are identical; and if identical, determining that the validity detection is passed.

5. The computer-implemented method of claim 1, wherein the identifying a verification token comprises:

identifying the verification token from the image of the insurance application verifying page by using an optical character recognition (OCR) technology.

6. The computer-implemented method of claim 1, wherein the identifying a verification token comprises:

identifying the verification token from the device image by using an optical character recognition (OCR) technology.

7. The computer-implemented method of claim 1, wherein the invoking a camera of the auxiliary device based on the graph verification code to collect a device image of the object device comprises:

after the image of the insurance application verifying page is collected, sending the graph verification code to a code platform; and in response to the code platform returning a collection instruction after parsing the graph verification code, invoking the camera of the auxiliary device to collect the device image of the object device.

8. A non-transitory, computer-readable medium storing one or more instructions executable by a computer system to perform operations comprising:

collecting, by an auxiliary device, an image of an insurance application verifying page of an object device, wherein a graph verification code and verification token are separately displayed on the insurance application verifying page, wherein the object device periodically and dynamically updates the graph verification code and the verification token, and an update period of the verification token is less than an update period of the graph verification code;

invoking, by the auxiliary device, a camera of the auxiliary device based on the graph verification code to collect a device image of the object device;

identifying, by the auxiliary device, the verification token displayed by the object device;

performing, by the auxiliary device, validity detection based on the verification token; and determining, by the auxiliary device, the device image as insurance application verification data of the object device.

9. The non-transitory, computer-readable medium of claim 8, wherein performing, by the auxiliary device, validity detection based on the verification token, comprises:

parsing out a generation moment of the verification token from the verification token;

obtaining a collection moment of the image of the insurance application verifying page;

determining whether a time difference between the collection moment and the generation moment is less than or equal to a first duration; and if the time difference between the collection moment and the generation moment is less than or equal to a first duration, determining that the validity detection is passed.

10. The non-transitory, computer-readable medium of claim 8, wherein performing, by the auxiliary device, validity detection based on the verification token comprises:

sending, to a server, the verification token, wherein the server:

parses out a generation moment of the verification token; and determines whether a time difference between the generation moment and a sending moment of the verification token is less than or equal to a second duration;

receiving, from the server, a validity detection pass message, wherein:

the validity detection pass message is sent by the server when determining that the time difference is less than or equal to the second duration; and the second duration is longer than first duration.

11. The non-transitory, computer-readable medium of claim 8 further comprising:

parsing out a first device identifier from the verification token;

parsing out a second device identifier from the graph verification code; and performing, by the auxiliary device, validity detection based on the verification token, comprising:

determining whether the first device identifier and the second device identifier are identical; and if identical, determining that the validity detection is passed.

12. The non-transitory, computer-readable medium of claim 8, wherein the identifying a verification token comprises:

identifying the verification token from the image of the insurance application verifying page by using an optical character recognition (OCR) technology.

13. The non-transitory, computer-readable medium of claim 8, wherein the identifying a verification token comprises:

identifying the verification token from the device image by using an optical character recognition (OCR) technology.

14. The non-transitory, computer-readable medium of claim 8, wherein the invoking a camera of the auxiliary device based on the graph verification code to collect a device image of the object device comprises:

after the image of the insurance application verifying page is collected, sending the graph verification code to a code platform; and in response to the code platform returning a collection instruction after parsing the graph verification code, invoking the camera of the auxiliary device to collect the device image of the object device.

15. A computer-implemented system, comprising:

at least two processors; and one or more computer memory devices interoperably coupled with the at least two processors and having tangible, non-transitory, machine-readable media storing one or more instructions that, when executed by the at least two processors, perform one or more operations comprising:

collecting, by an auxiliary device, an image of an insurance application verifying page of an object device, wherein a graph verification code and verification token are separately displayed on the insurance application verifying page, wherein the object device periodically and dynamically updates the graph verification code and the verification token, and an update period of the verification token is less than an update period of the graph verification code;

invoking, by the auxiliary device, a camera of the auxiliary device based on the graph verification code to collect a device image of the object device;

identifying, by the auxiliary device, the verification token displayed by the object device;

performing, by the auxiliary device, validity detection based on the verification token; and determining, by the auxiliary device, the device image as insurance application verification data of the object device.

16. The computer-implemented system of claim 15, wherein performing, by the auxiliary device, validity detection based on the verification token, comprises:

parsing out a generation moment of the verification token from the verification token;

obtaining a collection moment of the image of the insurance application verifying page;

determining whether a time difference between the collection moment and the generation moment is less than or equal to a first duration; and if the time difference between the collection moment and the generation moment is less than or equal to a first duration, determining that the validity detection is passed.

17. The computer-implemented system of claim 15, wherein performing, by the auxiliary device, validity detection based on the verification token comprises:

sending, to a server, the verification token, wherein the server:

parses out a generation moment of the verification token; and determines whether a time difference between the generation moment and a sending moment of the verification token is less than or equal to a second duration;

receiving, from the server, a validity detection pass message, wherein:

the validity detection pass message is sent by the server when determining that the time difference is less than or equal to the second duration; and the second duration is longer than first duration.

18. The computer-implemented system of claim 15 further comprising:

parsing out a first device identifier from the verification token;

parsing out a second device identifier from the graph verification code; and performing, by the auxiliary device, validity detection based on the verification token, comprising:

determining whether the first device identifier and the second device identifier are identical; and if identical, determining that the validity detection is passed.

19. The computer-implemented system of claim 15, wherein the identifying a verification token comprises:

identifying the verification token from the image of the insurance application verifying page by using an optical character recognition (OCR) technology; or identifying the verification token from the device image by using an optical character recognition (OCR) technology.

20. The computer-implemented system of claim 15, wherein the invoking a camera of the auxiliary device based on the graph verification code to collect a device image of the object device comprises:

after the image of the insurance application verifying page is collected, sending the graph verification code to a code platform; and in response to the code platform returning a collection instruction after parsing the graph verification code, invoking the camera of the auxiliary device to collect the device image of the object device.

* * * * *